(12) United States Patent
Yang et al.

(10) Patent No.: US 11,091,588 B2
(45) Date of Patent: Aug. 17, 2021

(54) CLICKABLE WATERBORNE POLYMERS AND CLICK-CROSSLINKED WATERBORNE POLYMERS, CLICKABLE FUNCTIONAL COMPOUNDS, CLICK FUNCTIONALIZED WATERBORNE POLYMERS, AND USES THEREOF

(71) Applicant: The Penn State Research Foundation, University Park, PA (US)

(72) Inventors: Jian Yang, State College, PA (US); Jianqing Hu, Guangzhou (CN); Jinshan Guo, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/356,470

(22) Filed: Mar. 18, 2019

(65) Prior Publication Data
US 2019/0211148 A1    Jul. 11, 2019

Related U.S. Application Data

(63) Continuation of application No. 15/137,506, filed on Apr. 25, 2016, now abandoned.
(Continued)

(51) Int. Cl.
*C08G 63/91* (2006.01)
*C09D 167/02* (2006.01)
(Continued)

(52) U.S. Cl.
CPC .......... *C08G 63/916* (2013.01); *C08F 226/06* (2013.01); *C08G 18/0823* (2013.01);
(Continued)

(58) Field of Classification Search
CPC .............. C08G 18/3836; C08G 18/679; C08G 18/0823
See application file for complete search history.

(56) References Cited

U.S. PATENT DOCUMENTS

| 4,567,228 | A | 1/1986 | Gaa et al. |
| 4,582,873 | A | 4/1986 | Gaa et al. |

(Continued)

FOREIGN PATENT DOCUMENTS

| CN | 101768278 A | 7/2010 |
| CN | 101787136 B | 7/2010 |

(Continued)

OTHER PUBLICATIONS

Li et al. The Cu(I)-mediated azide-alkyne cycloadditions as a facile and efficient route for functionalization of waterborne polyurethane. J Polym Res (2014) 21:320. DOI 10.1007/s10965-013-0320-4 (Year: 2013).*

(Continued)

*Primary Examiner* — Michael M Dollinger
(74) *Attorney, Agent, or Firm* — Hodgson Russ LLP

(57) ABSTRACT

Clickable waterborne polymers, click crosslinking of waterborne polymers, click crosslinked waterborne polymers, clickable functional compounds, and click functionalized waterborne polymers are presented. For example, the waterborne polymers have pendant groups bearing alkyne and/or azide groups and alkyne. For example, the functionalized azide-containing functional compounds such as antimicrobial or infrared-refractive compounds. The click crosslinking of clickable waterborne polymers or polymer mixtures, and the click conjugation of clickable waterborne polymers with clickable functional compounds such as clickable antimicrobial or infrared-refractive compounds, which resulted in functional waterborne polymers with antimicrobial or infrared-refractive functions, are presented. The presented (Continued)

polymers, including clickable waterborne polymers, click-crosslinked waterborne polymers, and functional waterborne polymers with, for example, antimicrobial or infrared-refractive functions, can be used in applications such as coating and adhesive compositions. The aqueous suspensions of waterborne polymers can also be used directly as drug delivery systems, or can be crosslinked into hydrogels or composites for biomedical applications such as drug/cell delivery, tissue engineering, and other medical device.

8 Claims, 26 Drawing Sheets

Related U.S. Application Data

(60) Provisional application No. 62/152,498, filed on Apr. 24, 2015.

(51) Int. Cl.

| | |
|---|---|
| C08G 18/83 | (2006.01) |
| C08F 226/06 | (2006.01) |
| C09J 167/02 | (2006.01) |
| C09D 5/14 | (2006.01) |
| C08G 18/48 | (2006.01) |
| C08G 18/66 | (2006.01) |
| C08G 18/67 | (2006.01) |
| C08G 18/73 | (2006.01) |
| C08G 18/75 | (2006.01) |
| C08G 18/08 | (2006.01) |
| C09D 175/12 | (2006.01) |
| C09D 175/14 | (2006.01) |
| C08G 18/32 | (2006.01) |
| C08G 18/34 | (2006.01) |
| C08G 18/38 | (2006.01) |
| C09J 175/12 | (2006.01) |
| C09J 175/14 | (2006.01) |
| C09D 133/14 | (2006.01) |
| C09J 133/14 | (2006.01) |
| C08G 63/20 | (2006.01) |
| C08G 63/685 | (2006.01) |
| C08L 67/02 | (2006.01) |

(52) U.S. Cl.
CPC ....... *C08G 18/3206* (2013.01); *C08G 18/348* (2013.01); *C08G 18/3819* (2013.01); *C08G 18/4825* (2013.01); *C08G 18/4854* (2013.01); *C08G 18/6692* (2013.01); *C08G 18/679* (2013.01); *C08G 18/73* (2013.01); *C08G 18/755* (2013.01); *C08G 18/83* (2013.01); *C08G 18/833* (2013.01); *C08G 63/20* (2013.01); *C08G 63/685* (2013.01); *C08G 63/6856* (2013.01); *C08G 63/91* (2013.01); *C08L 67/02* (2013.01); *C09D 5/14* (2013.01); *C09D 133/14* (2013.01); *C09D 167/02* (2013.01); *C09D 175/12* (2013.01); *C09D 175/14* (2013.01); *C09J 133/14* (2013.01); *C09J 167/02* (2013.01); *C09J 175/12* (2013.01); *C09J 175/14* (2013.01); *C08G 2150/90* (2013.01)

(56) References Cited

U.S. PATENT DOCUMENTS

| | | | |
|---|---|---|---|
| 6,130,309 | A | 10/2000 | Reich et al. |
| 6,166,127 | A | 12/2000 | Tomko |
| 8,034,396 | B2 | 10/2011 | Kapiamba et al. |
| 8,071,708 | B2 | 12/2011 | Ritter et al. |
| 8,101,238 | B2 | 1/2012 | Fokin et al. |
| 8,512,752 | B2 | 8/2013 | Crescenzi et al. |
| 8,889,799 | B2 | 11/2014 | Du Prez et al. |
| 8,927,682 | B2 | 1/2015 | Baker et al. |
| 9,598,604 | B2 | 3/2017 | Muenter |
| 2006/0041099 | A1 | 2/2006 | Cernohous et al. |
| 2009/0047517 | A1 | 2/2009 | Caruso et al. |
| 2009/0054619 | A1 | 2/2009 | Baker et al. |
| 2010/0121022 | A1 | 5/2010 | Musa et al. |
| 2010/0234482 | A1 | 9/2010 | Du Prez et al. |
| 2011/0112254 | A1 | 5/2011 | Manzara et al. |
| 2013/0323642 | A1 | 12/2013 | Bowman et al. |
| 2015/0368530 | A1 | 12/2015 | Carter et al. |

FOREIGN PATENT DOCUMENTS

| | | |
|---|---|---|
| CN | 102241820 B | 11/2011 |
| EP | 2014308 A2 | 1/2009 |
| WO | 2008/048733 A1 | 4/2008 |
| WO | 2013130985 A1 | 9/2013 |
| WO | 2014/122153 A1 | 8/2014 |
| WO | 2015035020 A1 | 3/2015 |

OTHER PUBLICATIONS

Garg et al. Clickable Polyurethanes Based on s-Triazine Ring Containing Aromatic Diisocyanate Bearing Pendent Alkyne Group: Synthesis and Postmodification. Journal of Polymer Science, Part A: Polymer Chemistry 2017, 55, 1008-1020. DOI: 10.1002/pola.28461 (Year: 2016).*

Iha, R.K., et al., Applications of Orthogonal, "Click" Chemistries in the Synthesis of Functional Soft Materials, Chem. Rev., Nov. 2009, vol. 109, No. 11, pp. 5620-5686.

Meldal, M., et al., Cu-Catalyzed Azide—Alkyne Cycloaddition, Chem. Rev., 2008, vol. 108, pp. 2952-3015.

Kantheti, S., et al., The impact of 1,2,3-triazoles in the design of functional coatings, RSC Adv., Dec. 5, 2014, vol. 5, pp. 3687-3708.

Avti, P.K., et al., Alkyne-Azide "Click" Chemistry in Designing Nanocarriers for Applications in Biology, Molecules, 2013, vol. 18, pp. 9531-9549.

Uliniuc, A., et al., Toward tunable amphiphilic copolymers via CuAAC click chemistry of oligocaprolactones onto starch backbone, Carbohydrate Polymers, 2013, vol. 96, pp. 259-269.

Riva, R., et al., Contribution of "click chemistry" to the synthesis of antimicrobial aliphatic copolyester, Polymer, 2008, vol. 49, No. 8, pp. 2023-2028.

Fournier, D., et al., "Click" Chemistry as a Promising Tool for Side-Chain Functionalization of Polyurethanes, Macromolecules, Jul. 1, 2008, vol. 41, No. 13, pp. 4622-4630.

* cited by examiner

Clickable diols with alkyne groups

Clickable diols with azide groups (FTIR spectra of clickable diols with alkyne or azide groups)

($^1$HNMR spectra of clickable diols with alkyne or azide groups)

Clickable vinyl containing monomer with alkyne groups

Clickable vinyl containing monomer with azide groups

FTIR spectra of clickable vinyl containing monomer with alkyne or azide groups $^1$HNMR spectra of clickable vinyl containing monomer with alkyne or azide groups (polyester dispersions with side-chain alkyne groups)
PED- alkyne 1

(polyester dispersions with side-chain azide groups)
PED- azide 1

M3-1　　M3-2　　M3-3

M4-1　　M4-2　　M4-3

P1-1

P2-1

P2-2

FG = functional molecules with antimicrobial or infrared-refractive function

F

CLICKABLE WATERBORNE POLYMERS AND CLICK-CROSSLINKED WATERBORNE POLYMERS, CLICKABLE FUNCTIONAL COMPOUNDS, CLICK FUNCTIONALIZED WATERBORNE POLYMERS, AND USES THEREOF

CROSS REFERENCE TO RELATED APPLICATIONS

This application is a continuation of U.S. patent application Ser. No. 15/137,506, filed on Apr. 25, 2016, which claims priority to U.S. Provisional Application No. 62/152,498, filed on Apr. 24, 2015, the disclosures of each of which are hereby incorporated by reference.

FIELD OF THE DISCLOSURE

The present disclosure relates to clickable waterborne polymers, click crosslinking of waterborne polymers, click cross-linked waterborne polymers, clickable functional compounds and functionalized waterborne polymers. More particularly, the present disclosure relates to clickable waterborne polymers with pendant groups bearing alkyne or azide groups and alkyne or azide-containing functional moieties such as antimicrobial or infrared-refractive molecules or particles.

BACKGROUND OF THE DISCLOSURE

With the increasingly stringent regulation on the amount of volatile organic compounds (VOCs) that can be emitted into atmosphere, there has been a trend towards the use of waterborne substitutes in the coatings and adhesives industries. Waterborne coatings and adhesives use water as the medium, thus making these products environment-friendly. Waterborne polymers represent the main components as binders for waterborne coatings and adhesives and have shown an increasingly potential value. In the synthesis of waterborne polymers, hydrophilic groups, for example, carboxylic, sulfonic, ammonium or other ionic groups can be incorporated into the polymer chains to render the water solubility or self-dispensability. But the resultant waterborne polymers also show some inherent drawbacks such as water sensitivity, heat-softening and low hardness. Therefore, compared to organic solvent-soluble coatings or adhesives, waterborne coatings and adhesives still need to be continuously improved in performances such as mechanical properties, water and chemical resistance, thermal resistance, and scrubbability, etc.

Waterborne polymers have been commercially used in the coatings and adhesives industries for several decades. When waterborne coatings or adhesives are applied, waterborne polymers used as binders will be dried to form a film via coalescence, a process whereby polymer particles come into contact with one another during drying, and polymer chains merge across boundaries of particles. There have been significant efforts in modifying waterborne polymer chains to improve the properties of films formed from waterborne polymers by many means, among which crosslinking modification is one of the most attractive methods.

Crosslinking of waterborne polymers in coatings and adhesives can enhance mechanical strength, adhesion, water resistance and durability of the formed film. Several crosslinking modifications have been widely utilized in waterborne polymers.

One of the commonly used crosslinking systems is based upon N-methylolacrylamide (NMA). U.S. Pat. Nos. 3,081,197, 3,380,851 discloses waterborne polymers including self-crosslinking polymers of vinyl acetate and ethylene with NMA incorporated into the polymer as a crosslinker. The NMA crosslinker provides enhanced wet strength and resistance to water and solvent; however, these polymers tend to emit formaldehyde thus presenting a health risk. U.S. Pat. Nos. 4,449,978, 5,540,987 and EP 1,201,685 A2 disclose methods to reduce the amount of formaldehyde by the usage of NMA together with acrylamide or by the presence of a redox catalyst system based upon a hydrophobic hydroperoxide and ascorbic acid. These techniques do significantly lower the formaldehyde emission but still cannot provide completely formaldehyde free systems. U.S. Pat. Nos. 3,714,099 and 5,021,529 further disclose that using N-ethylolacrylamide as the crosslinking monomer instead of NMA can obtain self-crosslinking waterborne polymers system completely free of formaldehyde, but the acetaldehyde in N-ethylolacrylamide as a chain transfer agent will results in the formation of low molecular weight polymers which fails to achieve desired mechanical strengths.

Another self-crosslinking system employed for waterborne polymers is based on the use of pendant acetoacetate groups, such as acetoacetoxyethyl methacrylate (AAEM). U.S. Pat. Nos. 5,494,975 and 5,296,530 disclose the preparation of polymers containing functional acetoacetate groups. Following the polymerization, the acetoacetate groups react with a functional amine to form an enamine. U.S. Pat. No. 5,296,530 further indicates the acetoacetate functional waterborne polymers will cure more quickly under the assistance of sunlight or ultraviolet light. U.S. Pat. No. 5,484,849 discloses air curable waterborne polymers containing an acetoacetate-functional polymer and an autoxidizable material which will cure on exposure to oxygen. The waterborne polymers containing acetoacetate groups as self-crosslinking system normally have a very short pot-life and often require the addition of a blocking agent which tends to severely retard cure.

Still another type of self-crosslinking mechanism for waterborne polymers is based on a keto-hydrazide crosslinking reaction of carbonyl and hydrazide groups. For example, U.S. Pat. No. 6,512,042 B1 and CN 102,010,478 A disclose crosslinking systems containing crosslinking agents of diacetone acrylamide (DAAM) and adipic acid dihydrazide (ADH), which experience a crosslinking reaction during the curing process of emulsions. CN 102,070,768 B reports the use of dihydroxylacetone as a functional monomer to introduce carbonyl groups into the waterborne polyurethane polymers to react with hydrazide groups. U.S. Pat. No. 4,983,662 discloses waterborne polyurethane having hydrazine functional groups and carbonyl functional groups disposed therein to provide a self-crosslinking reaction during and/or after film formation. The keto-hydrazide crosslinking reaction of carbonyl and hydrazide group results in the formation of hydrazone group with the removal of a water molecule, the system shows a slower crosslinking rate in the presence of water and the crosslinking system is water-sensitive due to the reversibility of reaction. So that, the keto-hydrazide crosslinking system has a relative slow reaction rate and the self-crosslinked polymers yield only minimally improved mechanical properties in the resultant films, particularly for scrubbability of waterborne coatings and adhesives. Moreover, self-crosslinking systems containing hydrazine groups also have the disadvantage that they can release small amounts of toxic hydrazine, which may cause health hazards.

Due to the above-mentioned limitations, there still exists a need for an efficient, fast, stable and safe crosslinking strategy to develop cross-linked waterborne polymers with improved mechanical properties, water and chemical resistance, thermal resistance and scrubbability, etc. Functionalization of waterborne polymers is another need to render waterborne polymer coating or adhesives with desired functionalities such as antimicrobial property or infrared-refractivity.

SUMMARY OF THE DISCLOSURE

The present disclosure provides clickable waterborne polymers, the click crosslinking of clickable waterborne polymers via copper-catalyzed azide-alkyne cycloaddition (CuAAC), and clickable functional compounds. For example, the clickable waterborne polymers have pendant groups bearing alkyne or azide groups. Also disclosed are alkyne or azide-containing functional compounds such as clickable antimicrobial or infrared-refractive compounds. The waterborne polymers with pendant groups bearing alkyne groups are capable of undergoing click reaction (crosslinking) with the waterborne polymers with pendant groups bearing azide groups through CuAAC. The resultant crosslinked polymers can be used for waterborne coatings or adhesives applications. The polymers can have improved mechanical strength, water-resistance, chemical-resistance, hydrolysis resistance, wear resistance and adhesion etc. The waterborne polymers with pendant groups bearing alkyne or azide groups can also be click-functionalized with azide or alkyne-containing functional compounds such as antimicrobial or infrared-refractive compounds to prepare waterborne antimicrobial or infrared-refractive coatings or adhesives.

This disclosure also describes methods for making clickable waterborne polymers with pendant groups bearing alkyne or azide groups. The waterborne polymers with pendant groups bearing alkyne groups are click-crosslinked with the waterborne polymers with pendant groups bearing azide groups to form click-crosslinked polymers with improved mechanical properties, stability, water resistance and other physiochemical properties. The waterborne polymers include, for example, waterborne polyurethane (WPU), polyester dispersions (PED) by step-growth polymerization, and polyacrylate emulsions (PAE) by free-radical polymerization.

The objectives relating to clickable waterborne polymers of the disclosure are achieved by introducing small molecular clickable monomers into waterborne polymer syntheses to produce clickable waterborne polymers with pendant groups bearing alkyne or azide groups. The small molecular clickable monomers include, for example, clickable diols with alkyne or azide groups and clickable vinyl containing monomers with alkyne or azide groups, which can be introduced into a polymer backbone by step-growth polymerization and free-radical polymerization, respectively.

It is another objective of the disclosure to provide a method for making clickable waterborne polymers for waterborne coatings and adhesives. It is another objective of the disclosure to provide a crosslinking method of waterborne polymers for waterborne coatings and adhesives.

It is also another objective of the disclosure to provide a method for making clickable functional compounds with antimicrobial function or infrared-refractive function which, when the clickable functional compounds are click reacted with corresponding clickable waterborne polymers, significantly improves the functionality of waterborne polymers.

It is also another objective of the disclosure to provide a method for making more stable waterborne antimicrobial or infrared-refractive coatings or adhesives without burst release.

The objective relating to clickable functional compounds is accomplished via the click modification of functional compounds, for example, antimicrobial or infrared-refractive compounds. In this disclosure, functional molecules modified are, for example, benzisothiazolinone (BIT) with antimicrobial function, polyhexamethylene guanidine hydrochloride (PHMG) with antimicrobial function and indium tin oxide nanoparticles (ITO NPs) with infrared-refractive function. The clickable functional compounds include, for example, alkyne modified benzisothiazolinone (BIT-alkyne), alkyne modified polyhexamethylene guanidine hydrochloride (PHMG-alkyne), and alkyne or azide modified indium tin oxide nanoparticles (ITO NPs-alkyne and ITO NPs-azide).

Another objective of this disclosure is clickable waterborne polymer with pendant groups bearing clickable groups, where a clickable waterborne polymer is click-functionalized with a clickable functional compound to improve or endow waterborne polymers with antimicrobial or infrared-refractive functionalities to form antimicrobial or infrared-refractive waterborne coatings or adhesives.

The detailed applications of waterborne coatings and adhesives in this disclosure include, but are not limited to, the following: exterior and interior coatings, coil coatings, marine coatings, leather coatings, wood coatings, textile coatings and plastic coatings, plastic laminating adhesives, paper laminating adhesives, wood structural adhesives, and tissue adhesives etc.

Other objectives, advantages and features of this disclosure will be apparent from the following detailed description of the disclosure.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
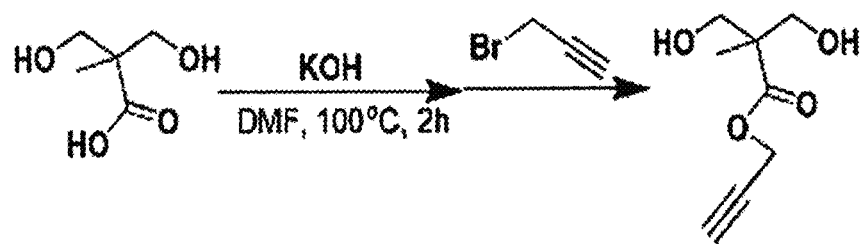
FIG. 1 shows a series of schemes showing the synthesis of clickable diols with alkyne or azide groups, which are suitable for preparing clickable waterborne polymers via step-growth polymerization, such as waterborne polyurethanes or polyester dispersions (PED). This figure is consistent with the embodiment of Example 1.
Figure 1:
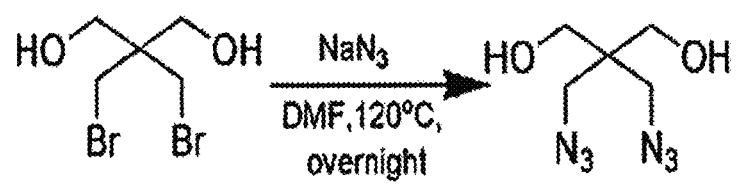
Figure 2:
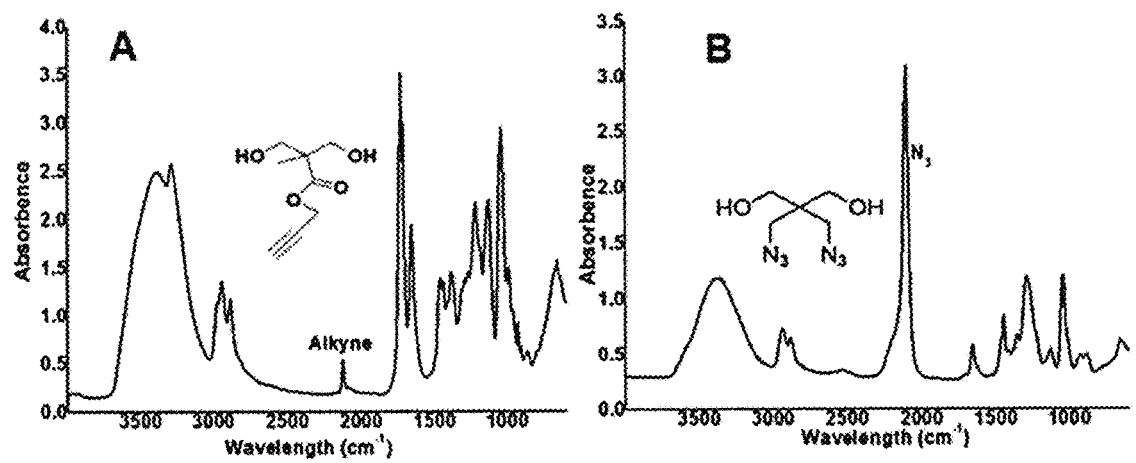
FIG. 2 shows the FTIR spectra and $^1$H NMR spectra of clickable diols with alkyne or azide groups which are synthesized in Example 1. The successful synthesis of clickable diols with alkyne groups was verified by the characteristic infrared absorption peak at around 2130 cm$^{-1}$ (A), and the characteristic $^1$H NMR peaks of protons on —CH$_2$—C≡CH (c in C) and —C≡CH (d in C). The successful synthesis of clickable diols with azide groups was confirmed by the appearance of the strong characteristic infrared absorption peak of azide group at around 2100 cm$^{-1}$ (B) and the left shift of the peak of protons on CH$_2$— link to azide groups (b in D, around 3.75 ppm) compared to the protons on CH$_2$— link to bromine groups on the starting material, 2,2-bis(bromomethyl)propane-1,3-diol (3.22 ppm).
Figure 2:
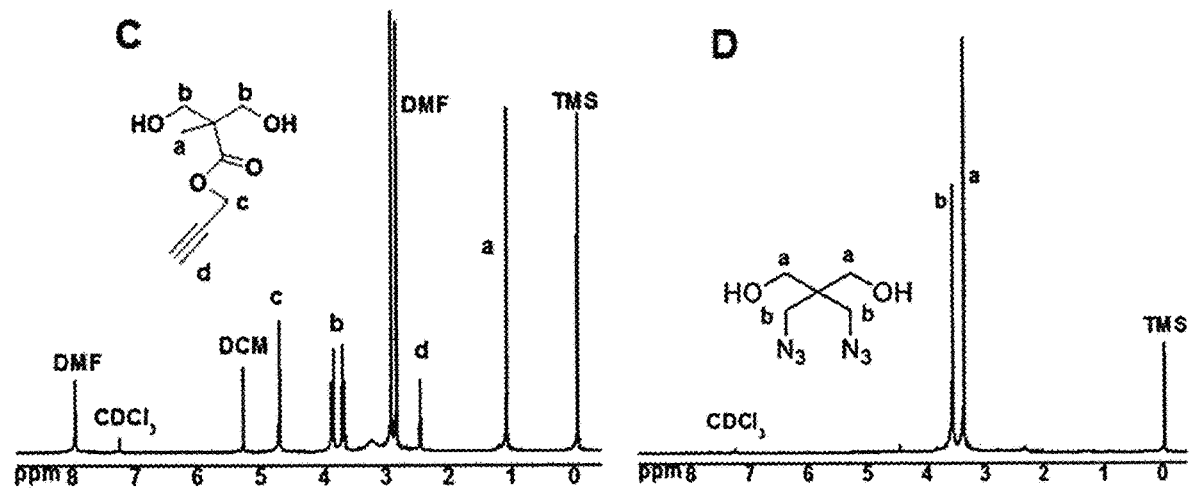

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

The present disclosure provides clickable waterborne polymers, click-crosslinked polymers, click-functionalized molecules, and functionalized waterborne polymers. For example, the clickable waterborne polymers have one or more pendant groups with alkyne or azide groups and the click-functionalized molecules are alkyne or azide-functionalized molecules with antimicrobial function or infrared-refractive function. Also provided are methods of making and using such polymers and molecules.

Click chemistry, especially copper-catalyzed azide-alkyne cycloaddition (e.g., using CuAAC), was used to make the waterborne polymers of the instant disclosure. This reaction is regioselective, forming only 1,4-substituted triazoles, is insensitive to oxygen, water, and a variety of solvents, and can be performed at room temperature. The reaction proceeds with high yields and the reaction rate is greatly faster than that of previous crosslinking reactions. Another important aspect is that the starting materials, azides and alkynes, are exceptionally stable and can be introduced in a wide range of polymers.

Alkyne or azide containing monomers were incorporated into waterborne polymer syntheses to create novel waterborne polymers with pendant groups bearing alkyne or azide groups. The waterborne polymers with pendant groups bearing alkyne groups are capable of undergoing click crosslinking reaction with the waterborne polymers with pendant groups bearing azide groups through, for example, CuAAC, which can significantly improve the mechanical properties of the waterborne polymer films. Moreover, clickable functional molecules, such as clickable functional antimicrobial or infrared-refractive compounds, were synthesized and incorporated into waterborne polymers through a click reaction. Using the clickable functional compounds to click react with corresponding clickable waterborne polymers can not only improve the stability of waterborne polymers but also confer various functions to coatings or adhesives made from waterborne polymers, such as antimicrobial or infrared-refractive functions.

The synthesis of clickable waterborne polymers of the disclosure was achieved through introducing small molecular clickable monomers with alkyne or azide groups into waterborne polymers backbone by step-growth polymerization or free-radical polymerization, to produce clickable waterborne polymers with pendant groups bearing alkyne or azide groups, and to provide waterborne polymers with click crosslinkability.

In an aspect, the present disclosure provides monomers comprising an alkyne or azide groups. The monomers can be used to synthesize clickable waterborne polymers.

Referring to FIG. 1, it shows a method for making small molecular clickable diols with alkyne or azide groups which are suitable for being introduced into waterborne polymers backbone by step-growth polymerization to produce clickable waterborne polyurethane or polyester dispersions with pendant groups bearing alkyne or azide groups.

Figure 17:
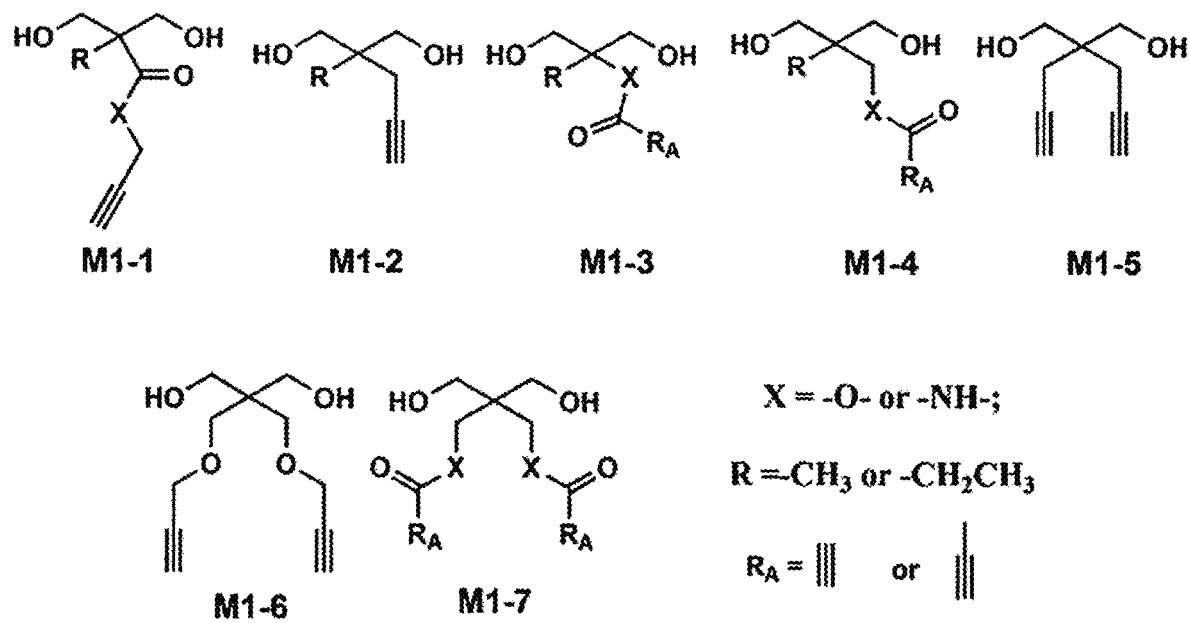
FIG. 17 shows examples of clickable diols with alkyne groups.

In an embodiment, the monomers are clickable diols with alkyne groups having schematic formula M1-1, M1-2, M1-3, M1-4, M1-5, M1-6 or M1-7, as shown in FIG. 17.

Figure 18:
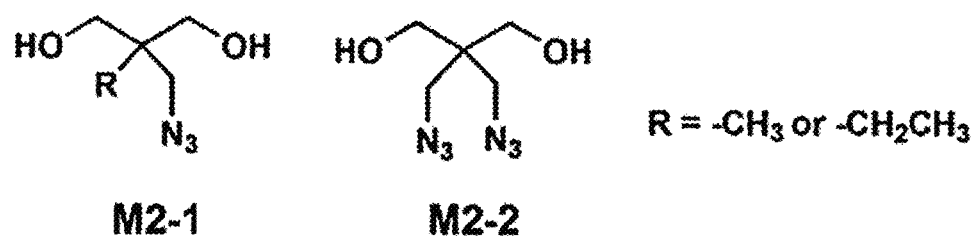
FIG. 18 shows examples of clickable diols with azide groups.

In an embodiment, the monomers are clickable diols with azide groups having schematic formula M2-1 or M2-2, as shown in FIG. 18.

Figure 3:
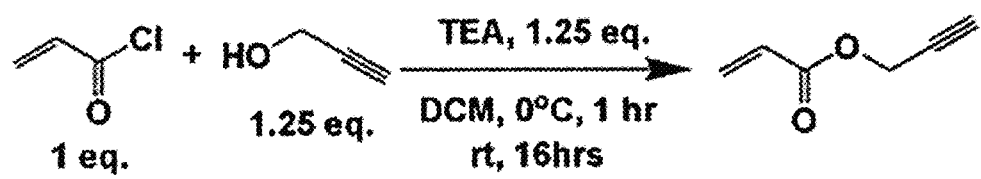
FIG. 3 shows a series of schemes showing the synthesis of clickable vinyl monomers with alkyne or azide groups, which are suitable for preparing clickable waterborne polymers via free-radical polymerization, such as polyacrylate emulsions (PAE). This figure is consistent with the embodiment of Example 2.
Figure 3:
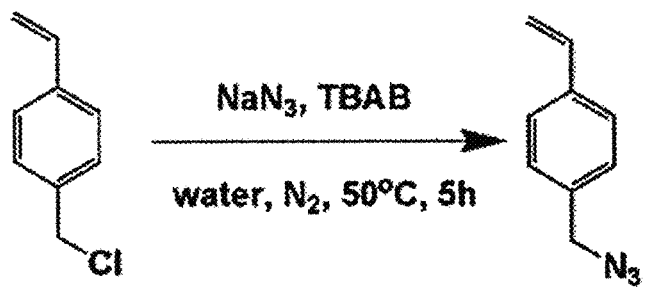
Figure 4:
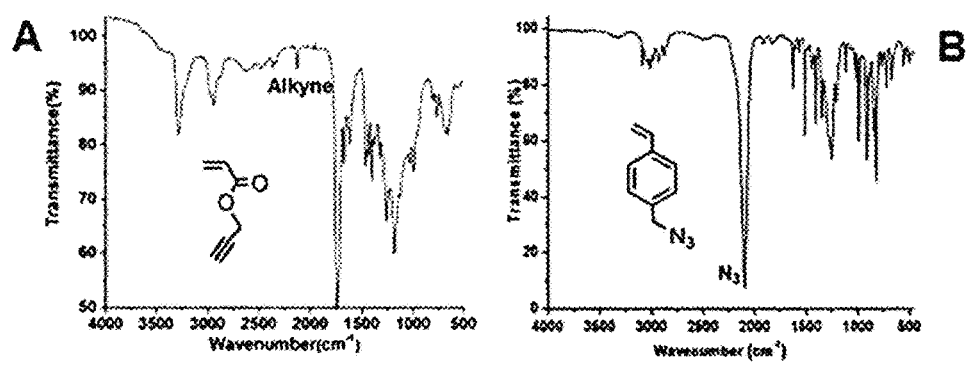
FIG. 4 shows the FTIR spectra and $^1$H NMR spectra of clickable vinyl monomers with alkyne or azide groups which are synthesized in Example 2. The successful synthesis of alkyne or azide functional vinyl monomers is demonstrated by the appearance of characteristic $^1$H NMR peak of —CH$_2$—C≡CH (d in C) and —C≡CH (e in C) of propargyl group or the infrared absorption peak of azide group at 2100 cm$^{-1}$ (B).
Figure 4:
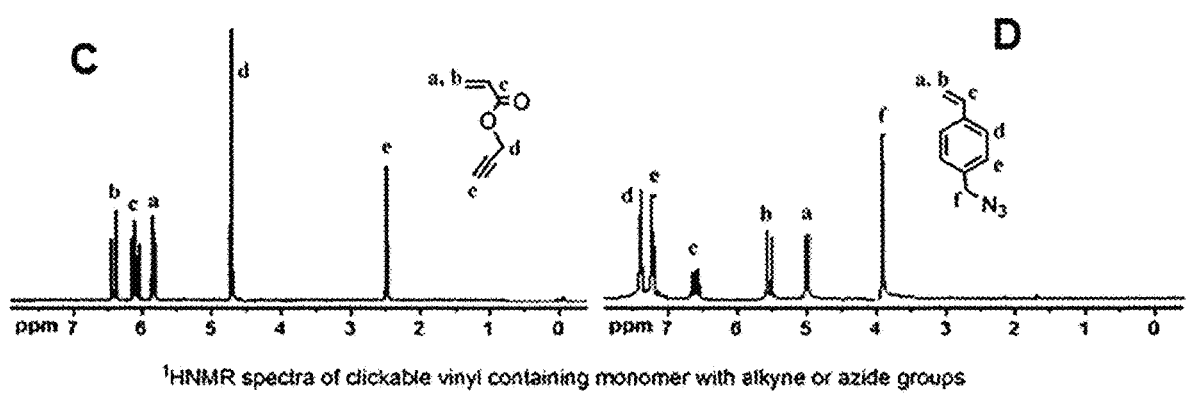
Figure 5:
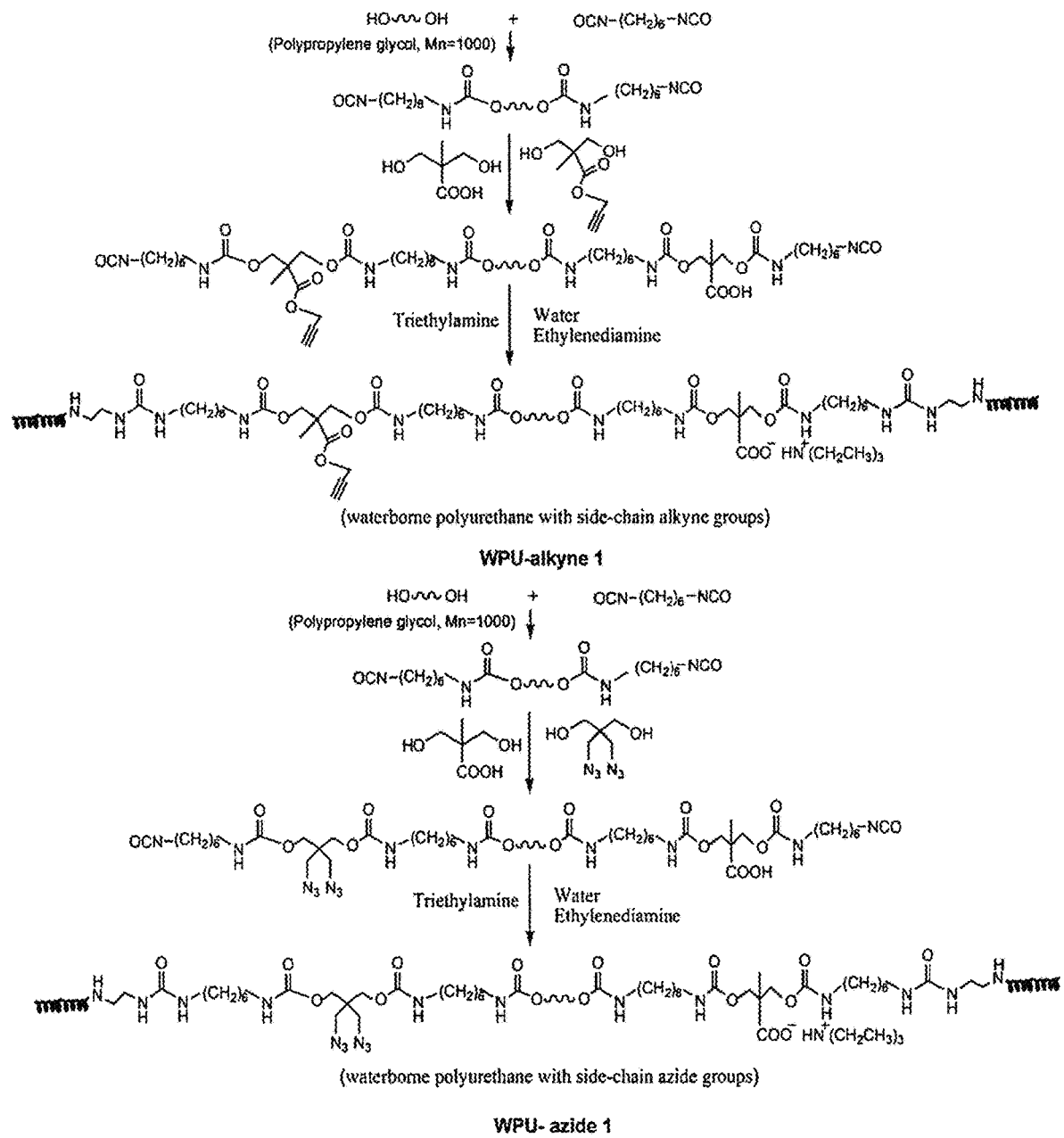
FIG. 5 shows a series of schemes showing the synthesis of clickable waterborne polyurethane with pendant groups bearing alkyne groups (WPU-alkyne 1) and clickable waterborne polyurethane with pendant groups bearing azide groups (WPU-azide 1). This figure is consistent with the embodiment of Example 3.
Figure 6:
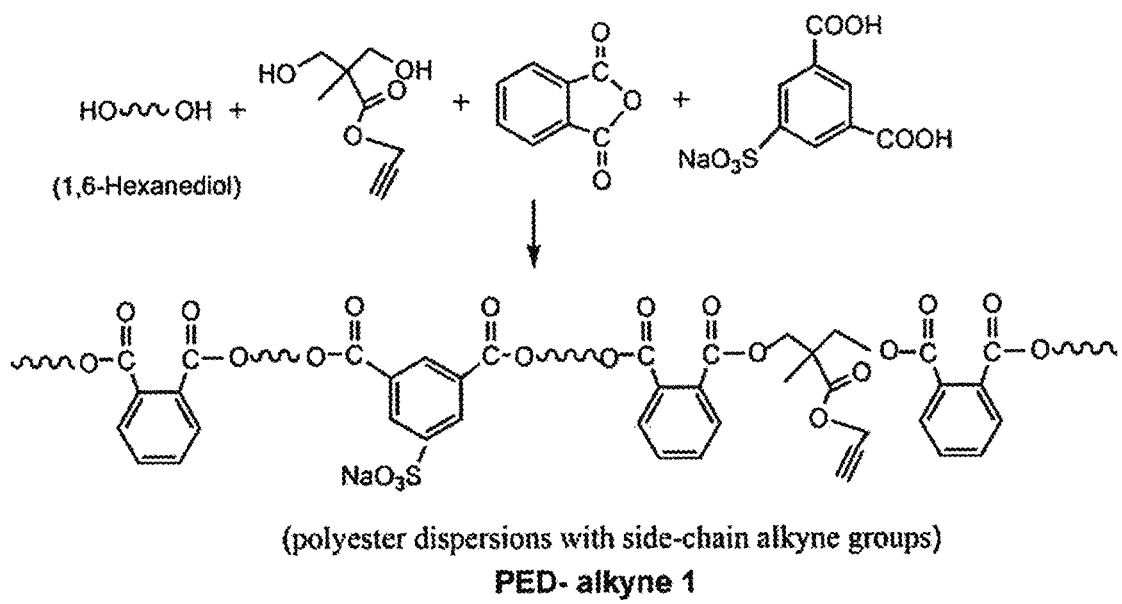
FIG. 6 shows a series of schemes showing the synthesis of clickable polyester dispersions with pendant groups bearing alkyne groups (PED-alkyne 1) and clickable polyester dispersions with pendant groups bearing azide groups (PED-azide 1). This figure is consistent with the embodiment of Example 4.
Figure 6:
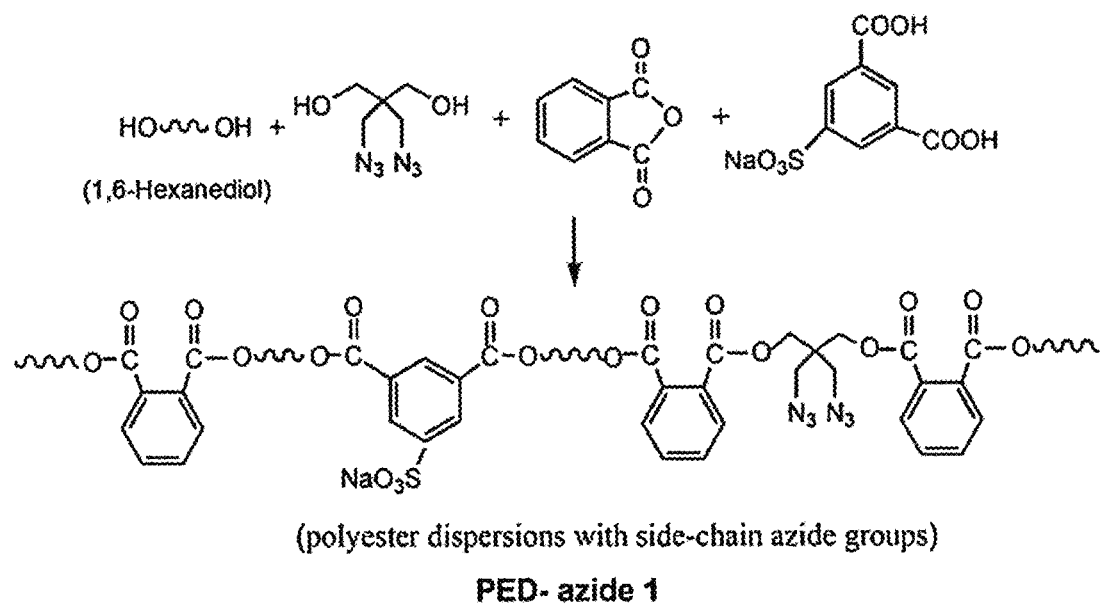
Figure 7:
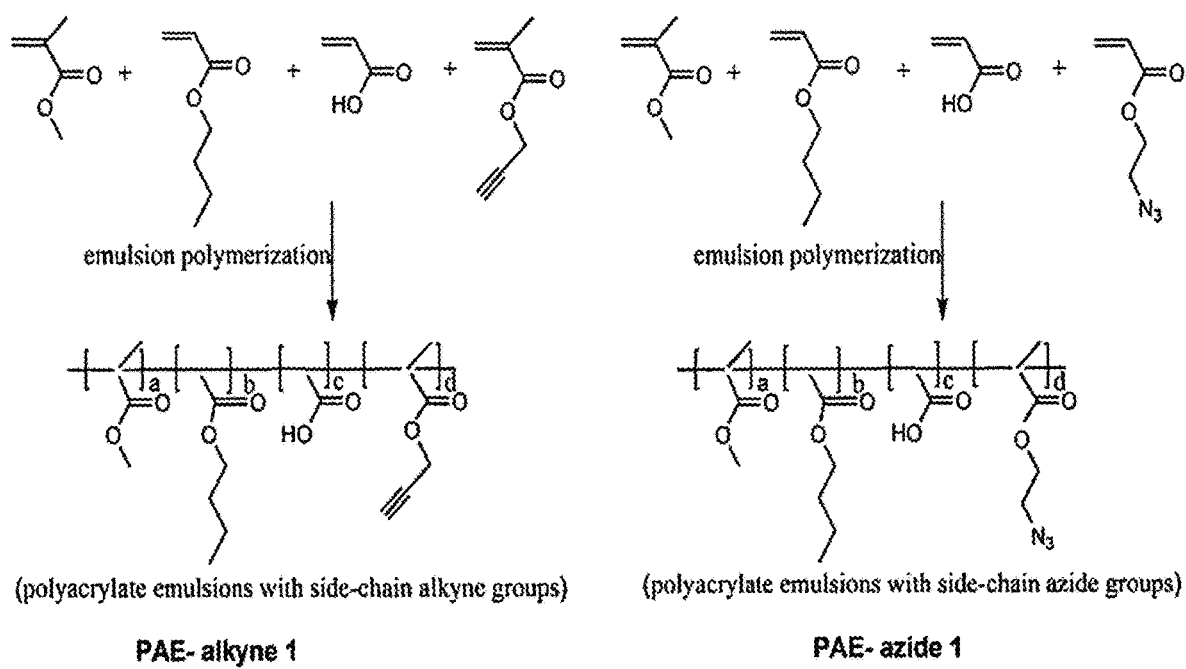
FIG. 7 shows a series of schemes showing the synthesis of clickable polyacrylate emulsions with pendant groups bearing alkyne groups (PAE-alkyne 1) and clickable polyacrylate emulsions with pendant groups bearing azide groups (PAE-azide 1). This figure is consistent with the embodiment of Example 5.
Figure 8:
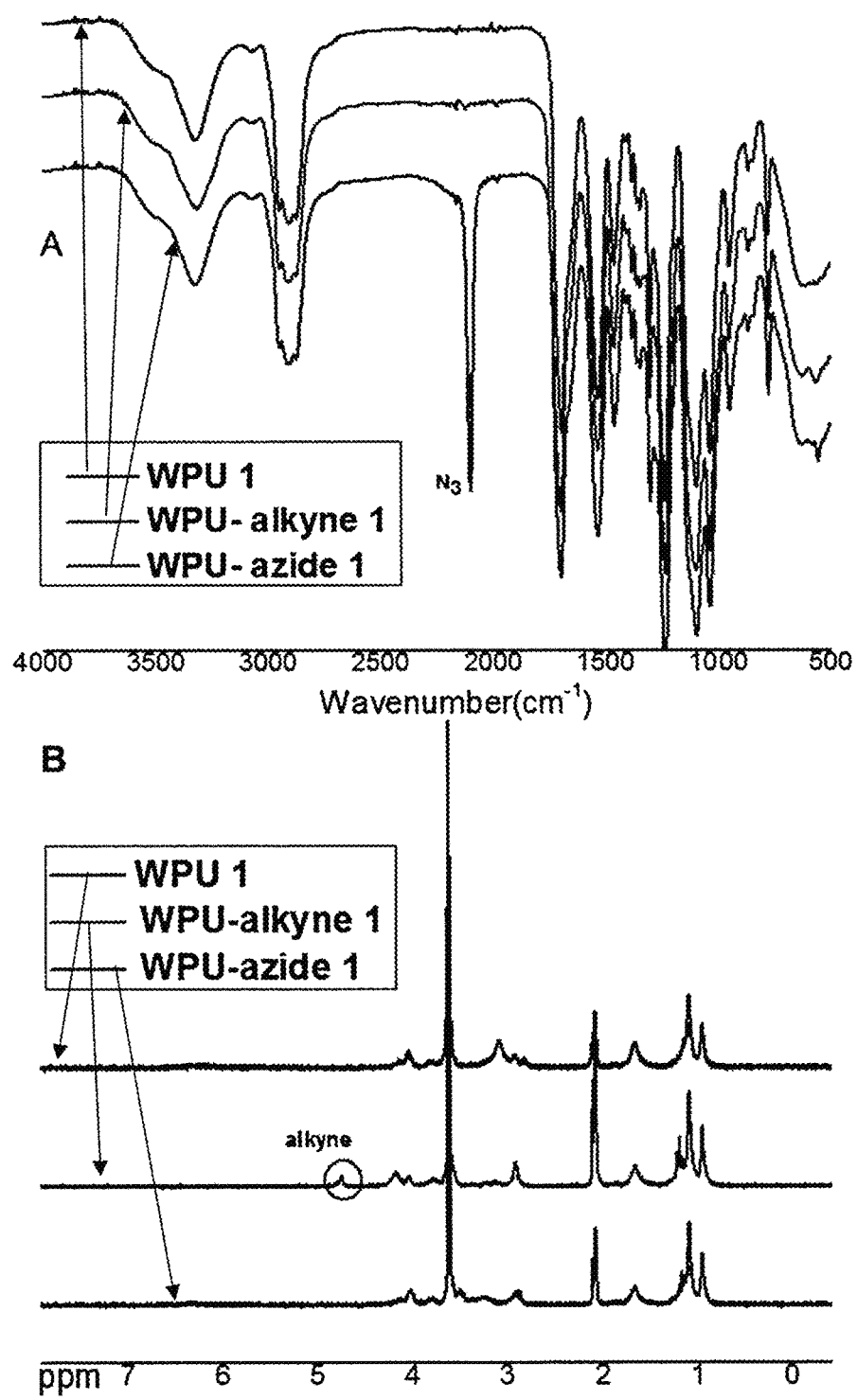
FIG. 8 shows the FTIR spectra and $^1$H NMR spectra of non-clickable waterborne polyurethane (WPU 1), clickable waterborne polyurethane with pendant groups bearing alkyne (WPU-alkyne 1) and clickable waterborne polyurethane with pendant groups bearing azide groups (WPU-azide 1) which are synthesized in Example 3. The successful introduction of azide or alkyne groups into waterborne polyurethanes was indicated by the appearance of the characteristic infrared absorption peak of azide (N$_3$) group at 2100 cm$^{-1}$ (A) or peak of the protons —CH$_2$—C≡CH in $^1$H NMR spectrum (B).
Figure 9:
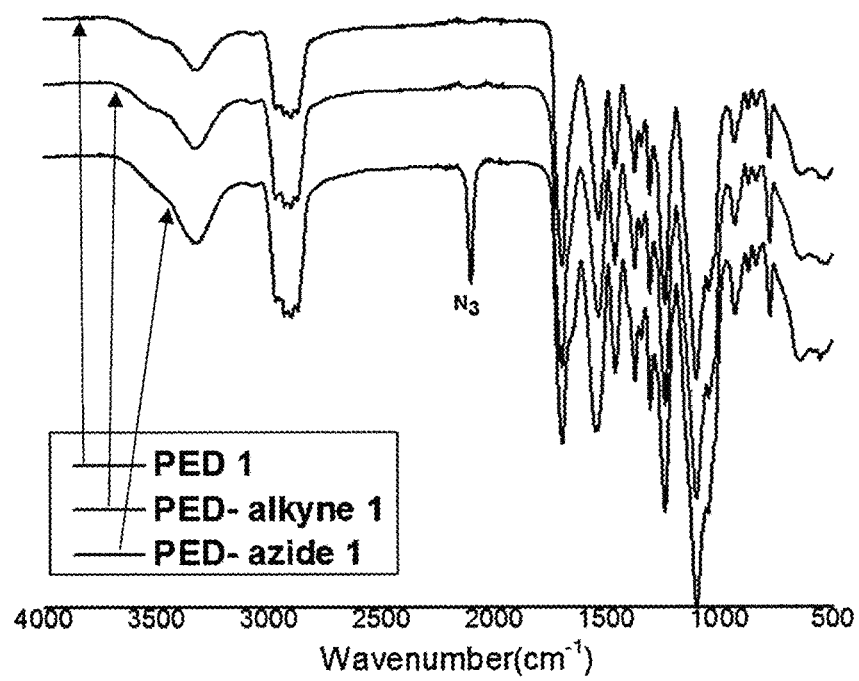
FIG. 9 shows the FTIR spectra of non-clickable polyester dispersions (PED 1), clickable polyester dispersions with pendant groups bearing alkyne groups (PED-alkyne 1) and clickable polyester dispersions with pendant groups bearing azide groups (PED-azide 1) which are synthesized in Example 4. The successful introduction of azide groups into polyester polymer was confirmed by the appearance of the characteristic infrared absorption peak of azide (N$_3$) group at 2100 cm$^{-1}$ (FIG. 9).
Figure 10:
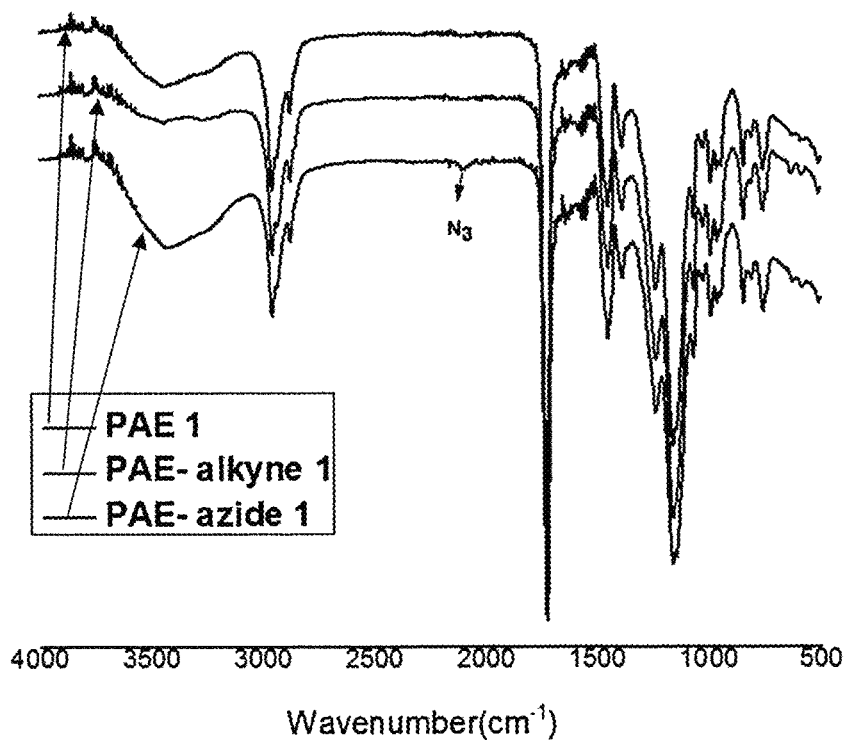
FIG. 10 shows the FTIR spectra of non-clickable polyacrylate emulsions (PAE 1), clickable polyacrylate emulsions with pendant groups bearing alkyne groups (PAE-alkyne 1) and clickable polyacrylate emulsions with pendant groups bearing azide groups (PAE-azide 1) which are synthesized in Example 5. The successful introduction of azide groups into polyacrylate polymer was confirmed by the appearance of the characteristic infrared absorption peak of azide (N$_3$) at 2100 cm$^{-1}$ (FIG. 10).
Figure 11:
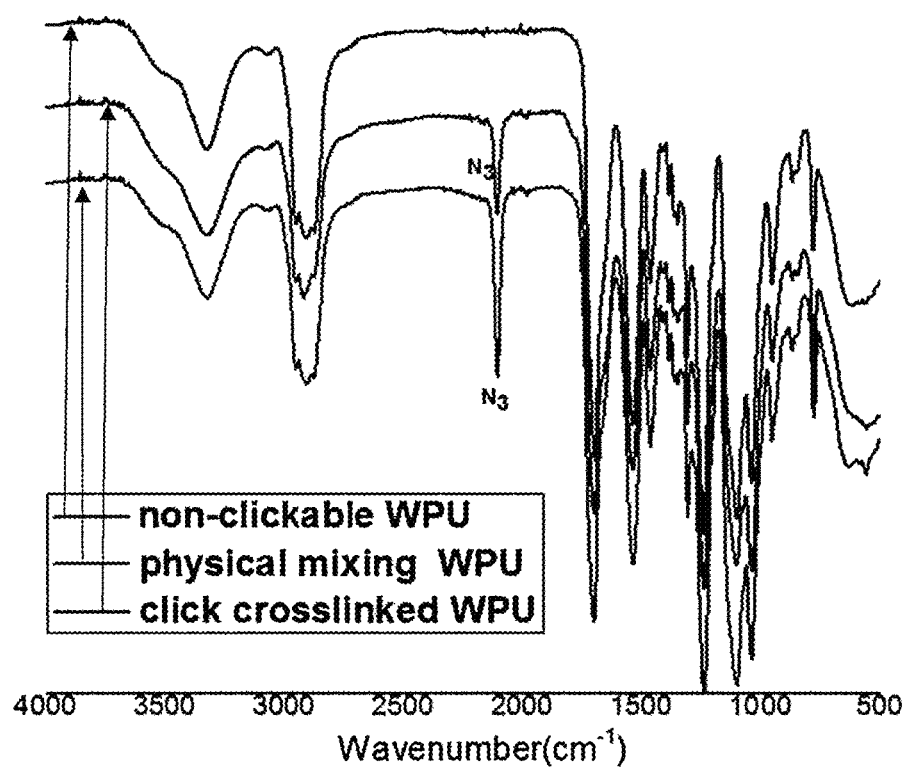
FIG. 11 shows the FTIR spectra of non-clickable WPU film, physical mixing WPU film, and click-crosslinked WPU film which are synthesized in Example 6 and 9. After applying copper(I)-catalyzed alkyne-azide cycloaddition (CuAAC, click reaction), some azide groups was consumed by click reaction, which can be seen from the decrease of the intensity of the characteristic infrared peak of azide group at 2100 cm$^{-1}$ of click-crosslinked WPU compared with that of physical mixing WPU (FIG. 11). Some azide groups were preserved even after click crosslinking, because the amount of azide group introduced were higher than that of alkyne group.
Figure 12:
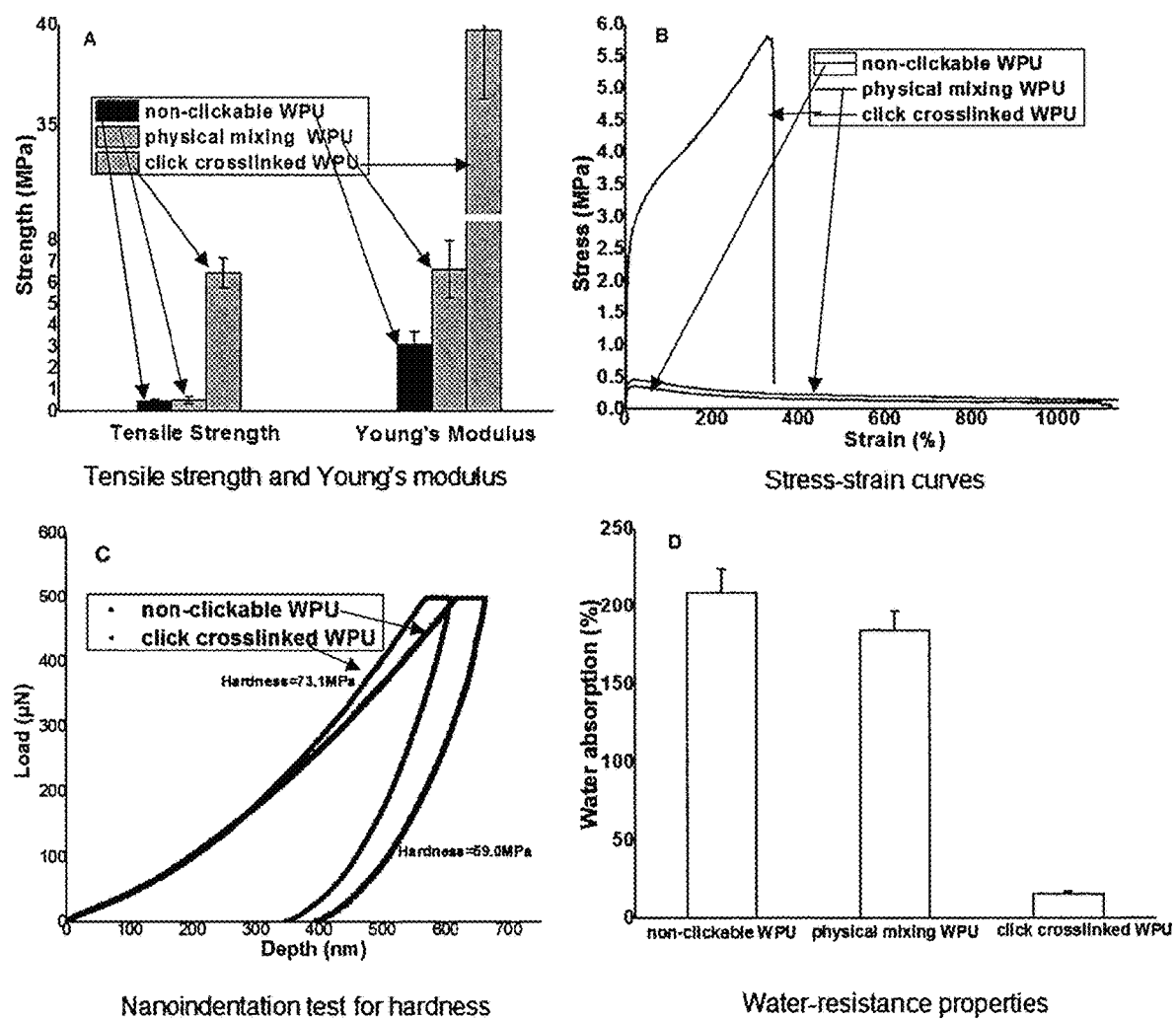
FIG. 12 shows the tensile strengths, Young's modulus, stress-strain curves, hardness (nanoindentation test) and water resistance properties of non-clickable WPU film, physical mixing WPU film, and click-crosslinked WPU film which are synthesized in Example 6 and 9. From A and B, it can be seen that click crosslinking greatly enhanced both the tensile strength and Young's modulus of so-formed click-crosslinked WPU film, while physical mixing WPU did not bring significant improvement in mechanical strength. Although the elongation of click-crosslinked WPU was decreased compared to that of non-clickable WPU and physical mixing WPU, it was still higher than 300%. Click crosslinking also enhanced the hardness and water resistance of WPU (C, D), especially for water resistance, the water absorption ratio dramatically decreased from higher than (for non-clickable WPU) or around (for physical mixing WPU) 200% to less than 20% when the films were immersed into water for 72 hours (D). The test results demonstrate that the high water resistance of coatings can be achieved by click crosslinking of clickable WPU.
Figure 13:
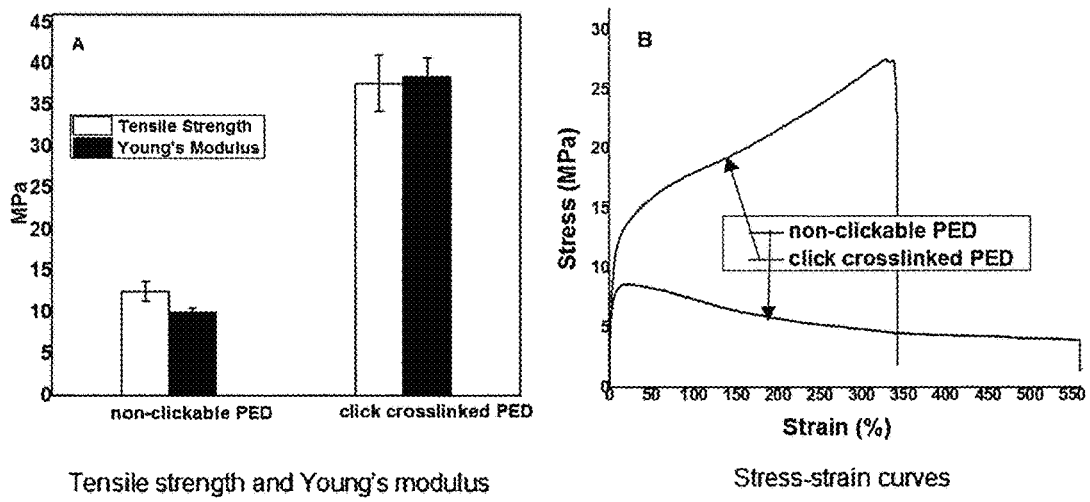
FIG. 13 shows the tensile strengths, Young's modulus, stress-strain curves of non-clickable PED film, physical mixing PED film, and click-crosslinked PED film which are synthesized in Example 7 and 9. The mechanical strength of polyester dispersion (PED) films was also greatly enhanced after applying click crosslinking (A), and the elongation did decreased but still was at a favorable level for coatings application (B).
Figure 14:
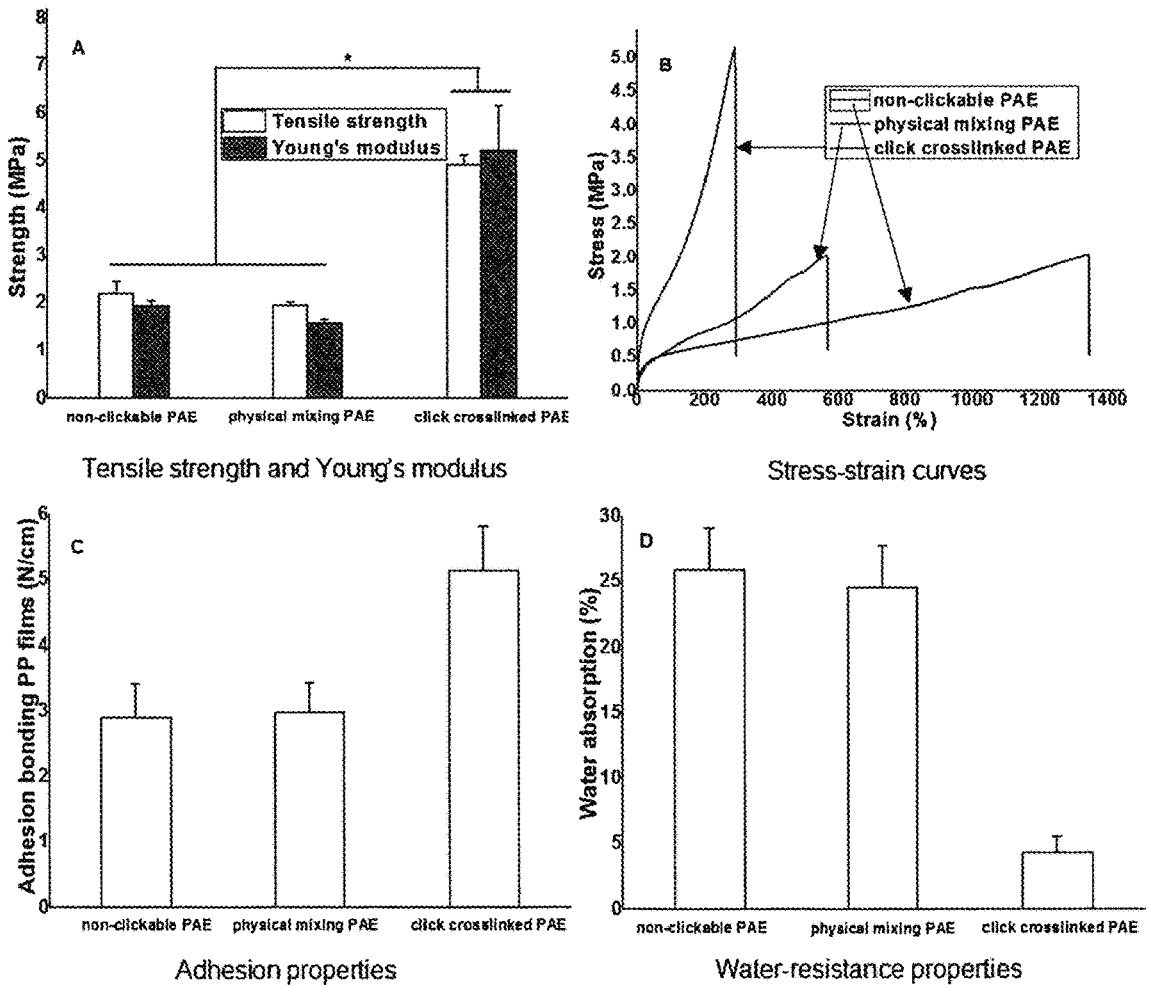
FIG. 14 shows the tensile strengths, Young's modulus, stress-strain curves of non-clickable PAE film, physical mixing PAE film, and click-crosslinked PAE film which are synthesized in Example 8 and 9. The tensile strength and Young's modulus of polyacrylate emulsions (PAE) film also increased after applying click crosslinking (A, B), the elongations of physical mixing and click-crosslinked PAE was decreased compared to that of non-clickable PAE film due to the introduction of rigid alkyne or alkyne & triazole groups (B). The adhesion strength of PAE to PP film (C) and water resistance (D) was also enhanced by click crosslinking.
Figure 15:
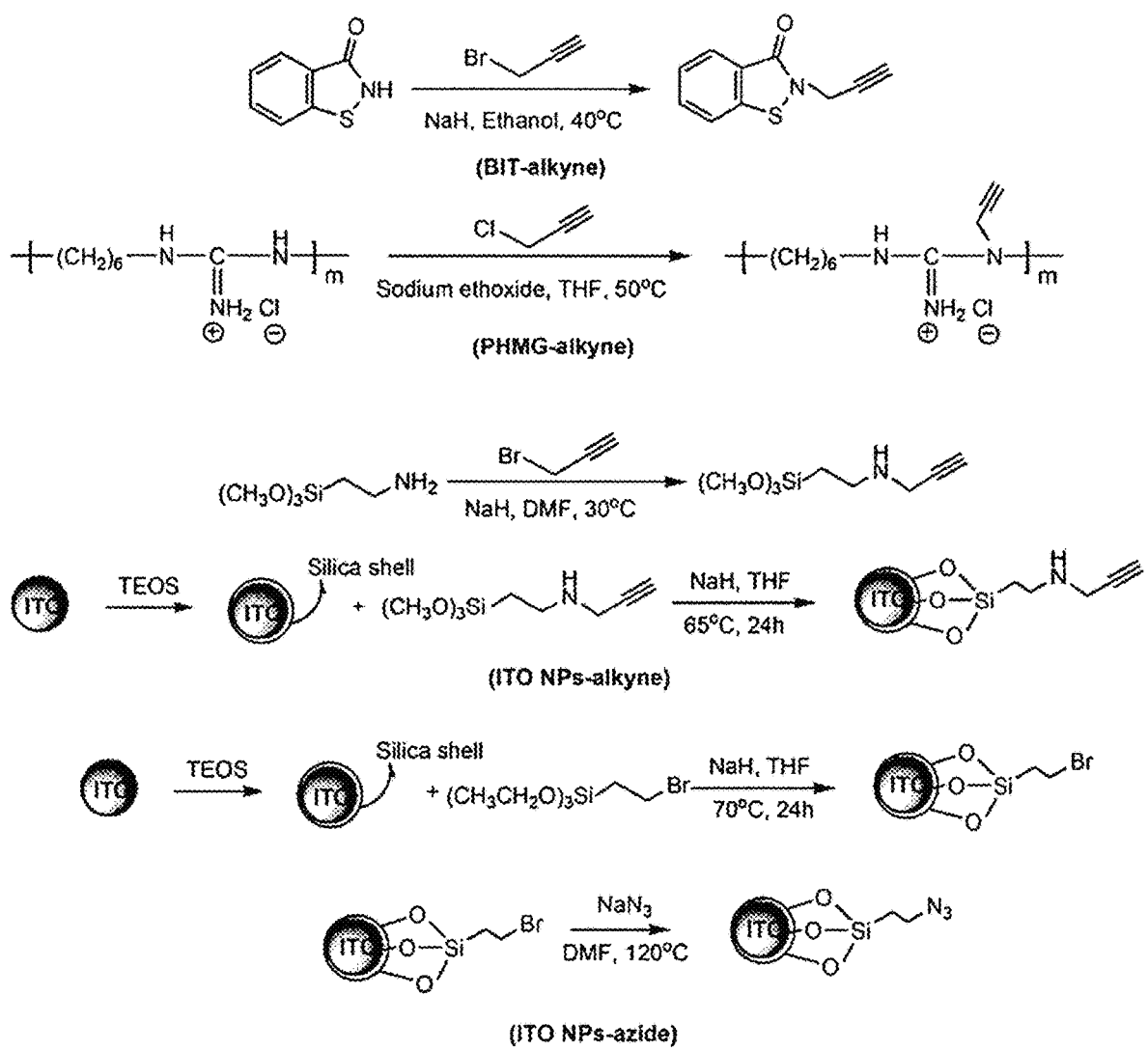
FIG. 15 shows a series of schemes showing the synthesis of alkyne-containing benzisothiazolinone (BIT-alkyne), alkyne-containing polyhexamethylene guanidine hydrochloride (PHMG-alkyne), alkyne and azide-containing functional indium tin oxide nanoparticles (ITO NPs-alkyne and ITO NPs-azide). This figure is consistent with the embodiment of Example 10.
Figure 16:
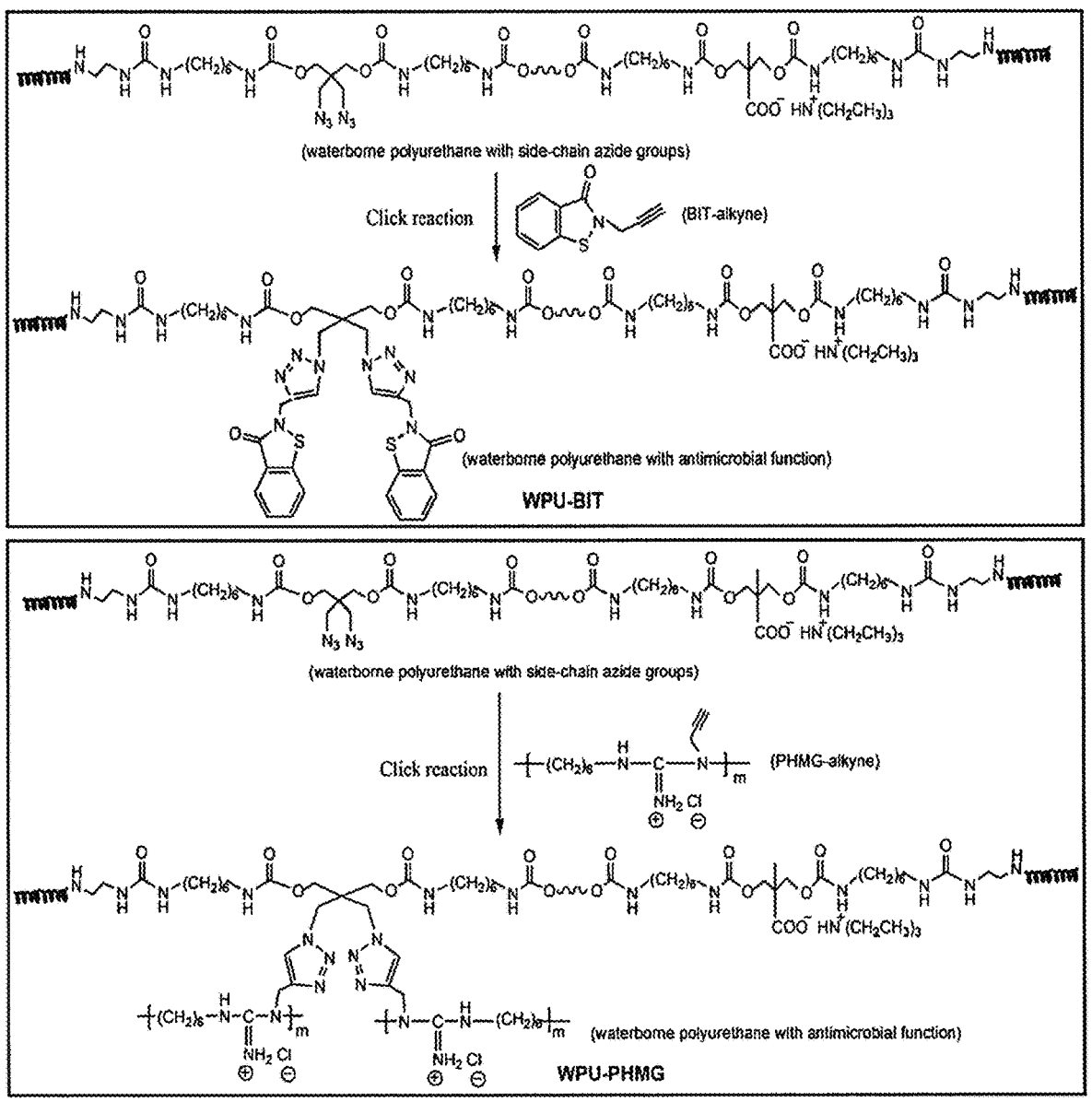
FIG. 16 shows a series of schemes showing the reaction of clickable waterborne polymers with clickable functional compounds to prepare functional waterborne polymers including WPU-BIT, WPU-PHMG, PAE-PHMG, PED-ITO NPs and WPU-ITO NPs. This figure is consistent with the embodiment of Example 11.
Figure 16:
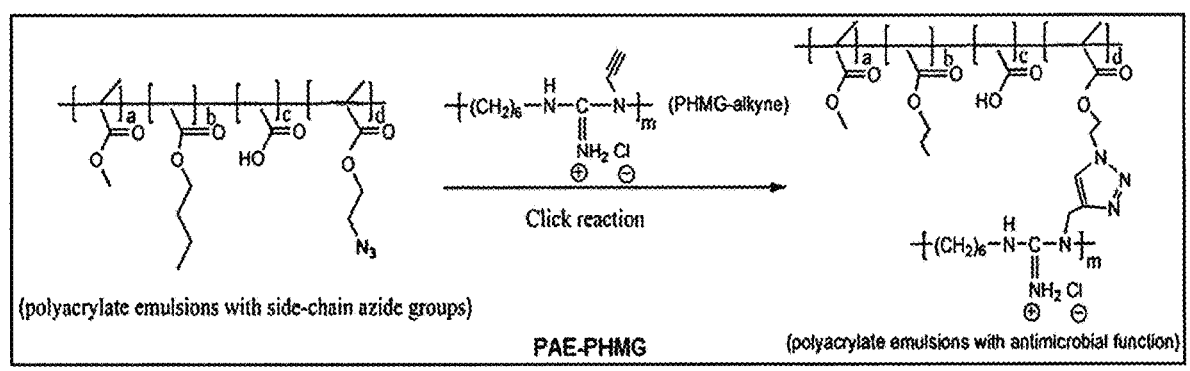
Figure 16:
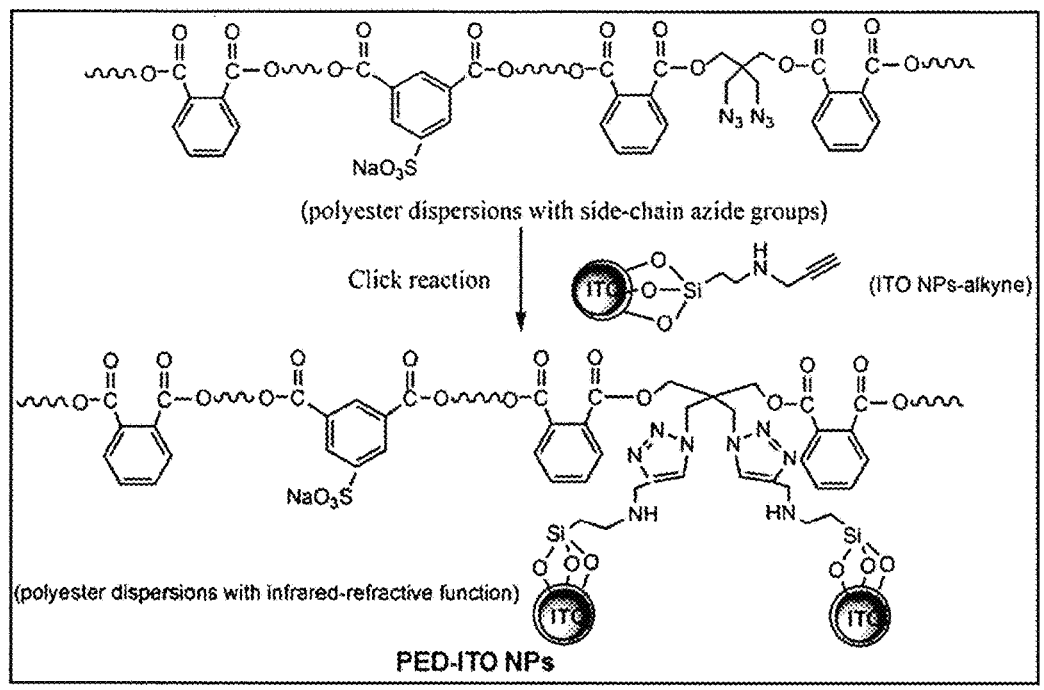
Figure 16:
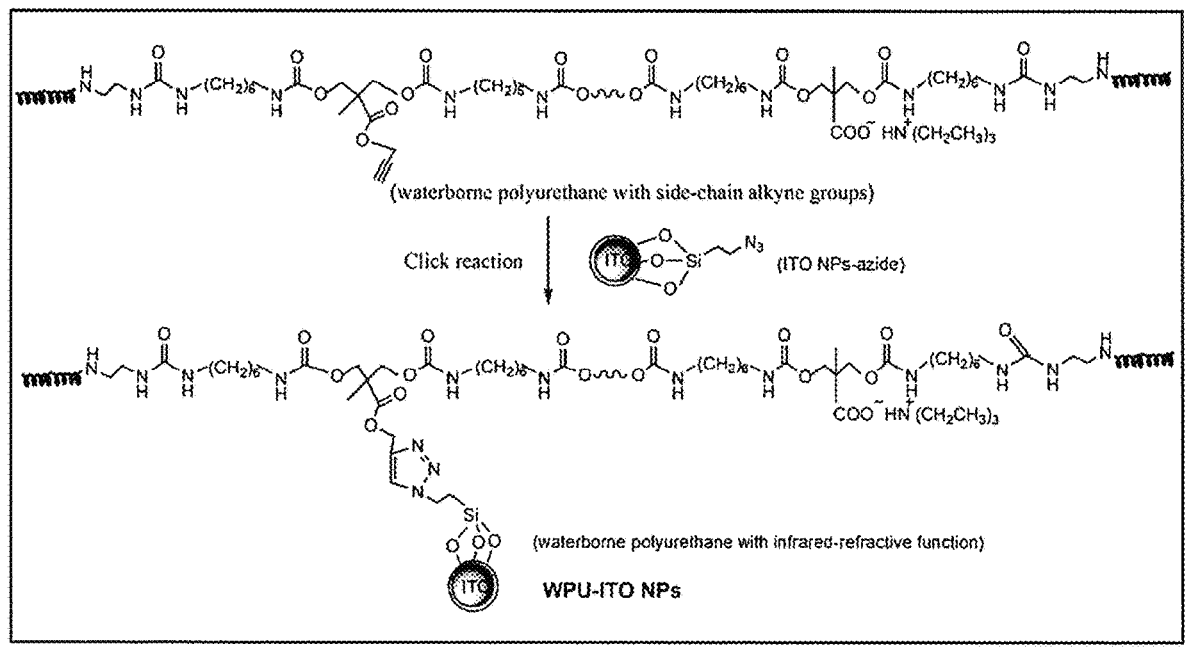
Figure 19:
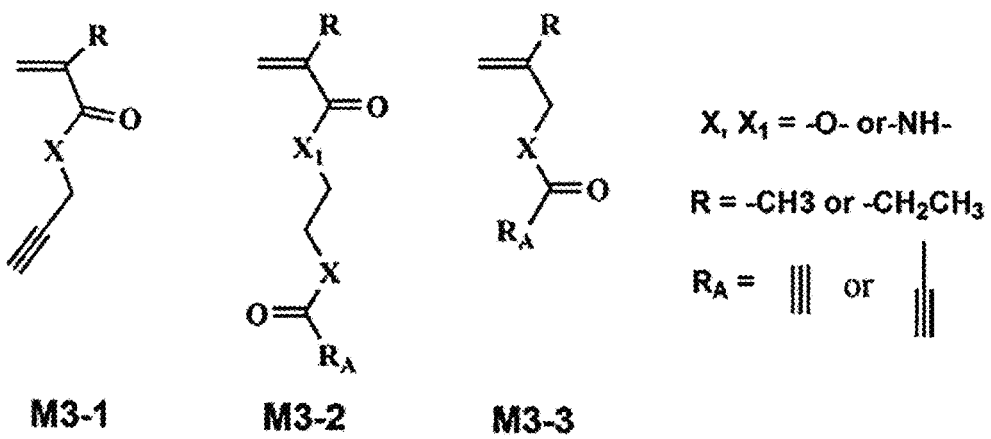
FIG. 19 shows examples of clickable vinyl monomers with alkyne groups.

Referring to FIG. 3, it shows a method for making small molecular clickable vinyl monomers with alkyne or azide groups which can be introduced into waterborne polymer backbones by free-radical polymerization to produce clickable polyacrylate emulsions. In an embodiment, the monomers are clickable vinyl monomers with alkyne groups having schematic formula M3-1, M3-2 or M3-3, as shown in FIG. 19.

Figure 20:
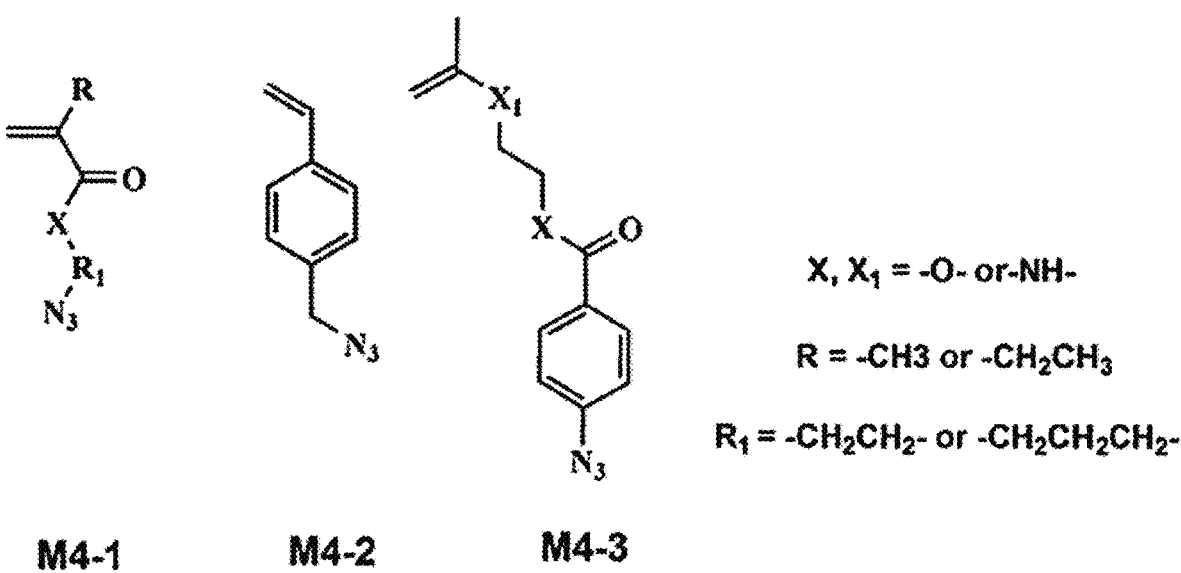
FIG. 20 shows examples of clickable vinyl monomers with azide groups.

In an embodiment, the monomers are clickable vinyl monomers with azide groups having schematic formula M4-1, M4-2 or M4-3, as shown in FIG. 20.

In an aspect, the present disclosure provides clickable waterborne polymers. The clickable waterborne polymers have at least one first pendant group (i.e., a side group) comprising an azide group and at least one second pendant group (i.e., a side group) comprising an alkyne group. The first pendant group(s) comprising an azide and the second pendant group(s) can be on the same polymer chain or on different polymer chains. In an embodiment, a clickable waterborne polymer is made by a method disclosed herein.

Figure 21:
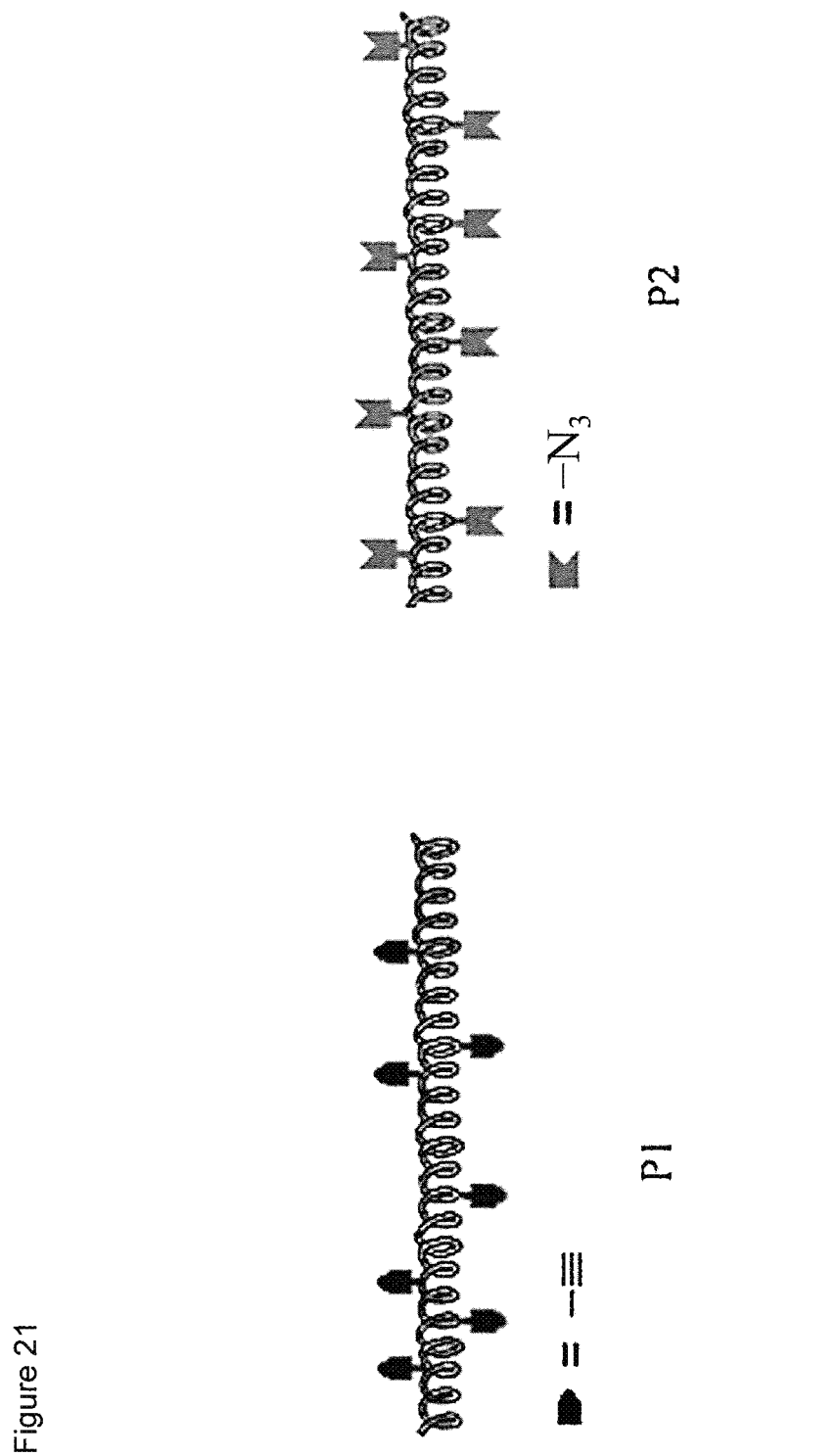
FIG. 21 shows examples of clickable waterborne polymers with pendant groups bearing alkyne and/or azide groups.

As used herein, the term "clickable waterborne polymers" means waterborne polymers containing at least one pendant group comprising an alkyne group and/or at least one pendant group comprising an azide group. The waterborne polymers can form aqueous dispersions. Waterborne polymers are dispersible (e.g. as dispersions or micelles) in aqueous media (e.g., water). The dispersions can be, but do not have to be, stable. For example, the waterborne polymers form a stable dispersion in an aqueous medium comprising an emulsifier and/or are stabilized by hydrophilic groups in the polymers. The waterborne polymers can be partially or completely water soluble. The waterborne polymers can be synthesized by step-growth polymerization or free-radical polymerization. The disclosure provides clickable waterborne polymers with pendant groups bearing alkyne and/or azide groups, which are expressed by schematic structures of P1 and P2, respectively, as shown in FIG. 21.

In an embodiment, the clickable waterborne polymer is a polyurethane, polyester, or polyacrylate polymer having at least one first pendant group comprising an azide group and/or at least one second pendant group comprising an alkyne group. In another embodiment, the clickable waterborne polymer is a polyurethane, polyester, or polyacrylate polymer having pendant groups comprising at least one azide group and/or pendant groups comprising at least one alkyne group.

The amount of clickable diols (and thus azide and alkyne groups) in the waterborne polyurethanes and polyesters (e.g., dispersions) can vary. In an embodiment, the clickable diols with alkyne/azide groups used is 0% to 20% (weight percentage) including all integer weight percentage values and ranges therebetween, based on the total solid weight of polyurethane or polyester. In an embodiment, the clickable diols with alkyne/azide groups used is 0.1% to 20% or 0.1% to 20% (weight percentage), including all integer weight percentage values and ranges therebetween, based on the total solid weight of polyurethane or polyester.

The amount of clickable vinyl monomers (and thus azide and alkyne groups) in the polyacrylate polymers (e.g., emulsions) can vary. In an embodiment, the clickable vinyl monomers with alkyne/azide groups used is 0% to 15% by weight, including all integer % by weight values and ranges therebetween, based on the total solid weight of polyacrylate. In an embodiment, the clickable vinyl monomers with alkyne/azide groups used is x % ($0<x\leq15$) (e.g., 0.1% to 15% or 0.01 to 15%) (weight percentage), including all integer weight percentage values and ranges therebetween, based on the total solid weight of polyacrylate.

The amount of clickable groups (azide and/or alkyne groups) in the waterborne polyurethanes or polyesters can vary. In an embodiment, a waterborne polyurethane or waterborne polyester comprises 5% to 20% (weight percentage based on the total solid weight of polyurethane or polyester) including all integer weight percentage values and ranges there between, clickable groups (alkyne and/or azide groups). In an embodiment, a waterborne polyurethane or waterborne polyester comprises x % ($0<x\leq20$) (e.g., 0.1% to 20% or 0.01 to 20%) (weight percentage based on the total solid weight of polyurethane or polyester) including all integer weight percentage values and ranges therebetween, clickable groups (alkyne and/or azide groups).

The amount of clickable groups (azide and/or alkyne groups) in the polyacrylate polymers can vary. In an embodiment, a waterborne polyacrylate comprises 5% to 15% (weight percentage based on the total solid weight of polyurethane or polyester), including all integer % by weight values and ranges there between, clickable groups (alkyne and/or azide groups). In an embodiment, a waterborne polyacrylate comprises x % ($0<x\leq15$) (e.g., 0.1% to 15% or 0.01 to 15% (weight percentage based on the total solid weight of polyurethane or polyester), including all integer % by weight values and ranges there between, clickable groups (alkyne and/or azide groups).

In an embodiment, the clickable waterborne polymers with pendant groups bearing alkyne groups (P1) include clickable waterborne polyurethane with alkyne groups (P1-1) and clickable polyester dispersions with alkyne groups (P1-2), which can be synthesized by step-growth polymerization, and clickable polyacrylate emulsions with alkyne groups (P1-3), which can be synthesized by free-radical polymerization. The clickable waterborne polymers with pendant groups bearing azide groups (P2) include clickable waterborne polyurethane with azide groups (P2-1) and clickable polyester dispersions with azide groups (P2-2), which can be synthesized by step-growth polymerization, and clickable polyacrylate emulsions with azide groups (P2-3), which can synthesized by free-radical polymerization.

In an aspect, the present disclosure provides methods of making clickable waterborne polymers. For example, the methods use the clickable functional compounds of the present disclosure in step-growth polymerization or free-radical polymerizations.

In an embodiment, clickable waterborne polyurethanes with alkyne groups and clickable waterborne polyurethanes with azide groups are synthesized by step-growth polymerization (P1-1 and P2-1) comprising a) reacting (i) a diisocyanate with (ii) macromolecular polyol, at for example 70-90° C., b) adding (iii) dimethylol propionic acid to the product from a) to introduce carboxylic acid groups, c) adding (iv) clickable diol bearing alkyne or azide group(s) to the product from b) to modify polyurethane with clickable reactive groups; d) adding a base (e.g., (v) trimethylamine or triethylamine), at for example, 30-45° C., to neutralize carboxylic acid (i.e., to form an ammonium salt) to render the resulting polyurethane dispersible in water, and e) adding a chain extender (e.g., (vi) ethylenediamine) to the product from f), at, for example, room temperature in water phase.

Figure 22:
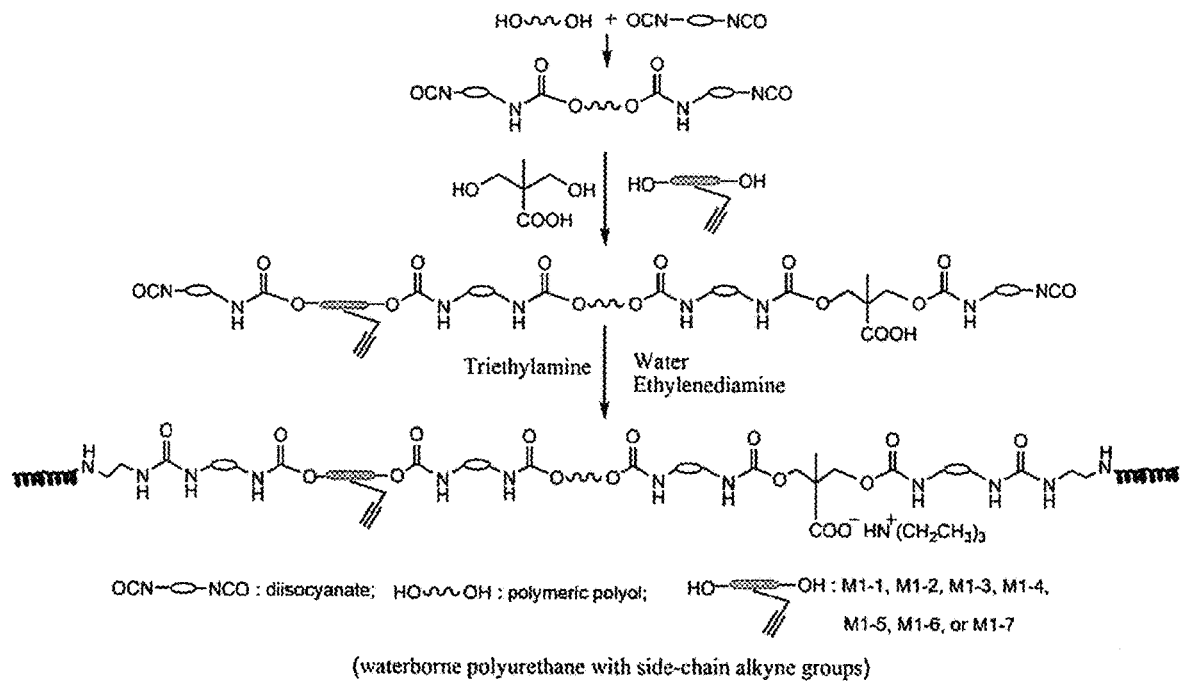
FIG. 22 shows examples of synthesis of clickable waterborne polyurethane with azide groups.
Figure 22:
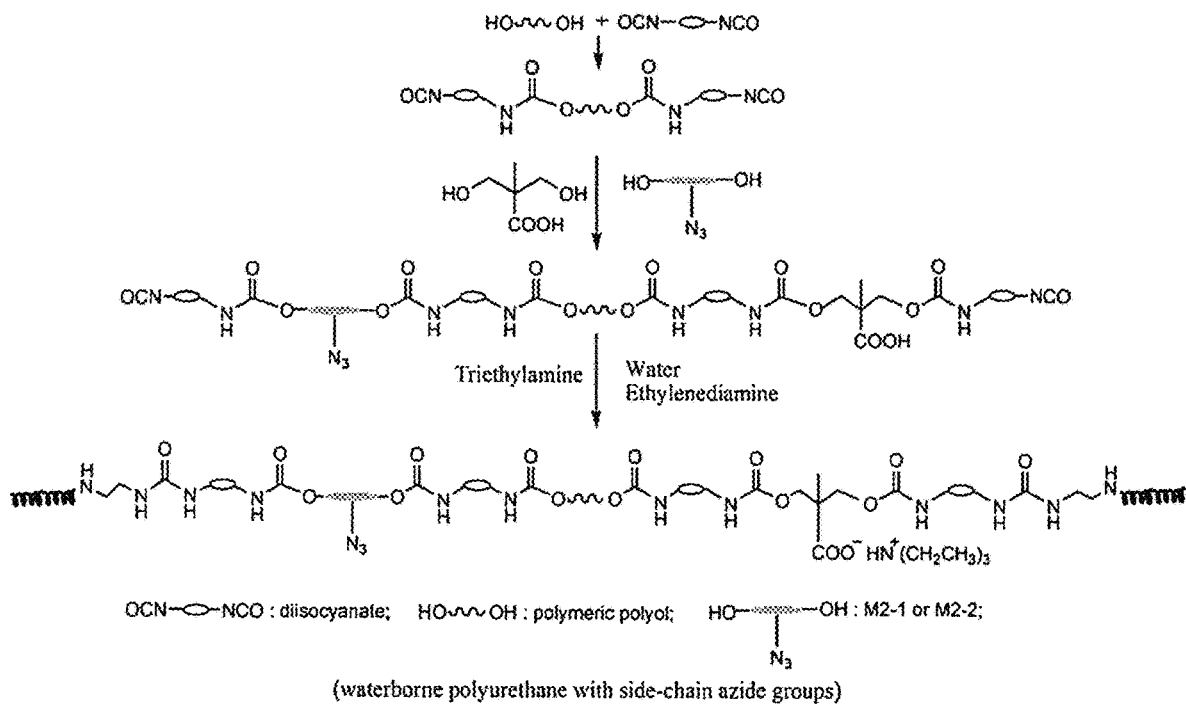

For example, clickable waterborne polyurethane with alkyne groups and clickable waterborne polyurethane with azide groups are synthesized by step-growth polymerization having the synthesis processes as P1-1 and P2-1, respectively, as shown in FIG. 22.

According to P1-1 and P2-1, the waterborne polyurethane with alkyne or azide groups are prepared, for example, firstly at, for example, 70-90° C., by reacting (i) a diisocyanate with (ii) polymeric polyol, then (iii) dimethylol propionic acid is added to introduce carboxylic acid groups, hereafter, (iv) clickable diol with alkyne or azide groups is introduced to modify polyurethane with clickable reactive groups; Finally, (v) triethylamine is added at, for example, 30-45° C. to neutralize carboxylic acid to render the resulting polyurethane dispersible in water, and (vi) ethylenediamine is used as chain extender at room temperature in water phase.

Examples of suitable diisocyanates include 1,6-hexamethylene diisocyanate (HDI), isophoronediisocyanate (IPDI), mixtures of 2,4- and 2,6-toluene diisocyanate (TDI), 4,4'-diphenylmethane diisocyanate (MDI), dicyclohexylmethanediisocyanate ($H_{12}$MDI), 4,4'-dibenzyl-diisocyanate, and 1,4-cyclohexylene diisocyanate. The preferred diisocyanates are 1,6-hexamethylene diisocyanate (HDI) and isophoronediisocyanate (IPDI).

The diisocyanate used is 15% to 65% by weight, including all integer % by weight values and ranges therebetween, based on the weight of the polyurethane solid. Preferably, the diisocyanate used is 25% to 55% by weight based on the total solid weight of polyurethane.

Examples of macromolecular polyols are polyethers such as poly(ethylene glycol) (PEG), poly(propylene glycol) (PPG) and poly(tetramethylene ether glycol), and biodegradable polyester diols based on poly(butanediol-co-adipate) glycol, poly(lactic acid)(PLA), poly(lactic-co-glycolic acid) (PLGA) and polycaprolactone (PCL). It is preferred to use difunctional compounds, although small amounts of trifunctional compounds may be used.

The molecular weight of the macromolecular polyol is 200 to 5000 Da, including all integer values and ranges therebetween. Preferably, the molecular weight of the macromolecular polyol is 1000 to 5000 Da.

The macromolecular polyol used is 15% to 50% by weight based on the solid weight of the polyurethane, including all integer % by weight values and ranges therebetween. Preferably, the macromolecular polyol used is 20% to 40% by weight based on the total solid weight of polyurethane.

The carboxylic acid diol (e.g., dimethylol propionic acid) used in amount is 2% to 10% by weight, including all integer % by weight values therebetween, based on the total solid weight of polyurethane.

With regard to the preparation of waterborne polyurethane with alkyne groups (e.g., (P1-1)), clickable diols with alkyne groups include, for example, M1-1, M1-2, M1-3, M1-4, M1-5, M1-6 and M1-7. The preferred clickable diols with alkyne groups are M1-1, M1-2 and M1-3. The clickable diols with alkyne groups may be employed singly or in a combination of two or more. The clickable diols with alkyne groups used in amount is 0% to 20% by weight, including all integer % by weight values and ranges therebetween, based on the total solid weight of polyurethane. In various examples, the clickable diols with alkyne groups used in amount is 0.1% to 20%, 0.01% to 20%, or 5% to 20% by weight, including all integer % by weight values and ranges therebetween, based on the total solid weight of polyurethane.

With regard to the preparation for waterborne polyurethane with azide groups (e.g., (P2-1)), clickable diols with azide groups include, for example, M2-1 and M2-2. The clickable diols with azide groups may be employed singly or in a combination of two or more. The clickable diols with azide groups used in amount is 0% to 20% by weight, including all integer % by weight values therebetween, based on the total solid weight of polyurethane. In various examples, the clickable diols with azide groups used in amount is 0.1% to 20%, 0.01% to 20%, 5% to 20% by weight, including all integer % by weight values therebetween, based on the total solid weight of polyurethane.

A base (e.g., trimethylamine) used in amount is to adjust the pH value of waterborne polyurethane from 7.5 to 9.5, including all 0.1 pH values intervals therebetween.

A chain extender (e.g., ethylenediamine) is used in amount of 0.5% to 1.5% by weight, including all 0.1% by weight values therebetween, based on the total solid weight of polyurethane.

The clickable waterborne polyurethane with alkyne groups and clickable waterborne polyurethane with azide groups synthesized are stable, aqueous dispersions of polyurethane particles having a solid content of up to 55% by weight, preferably 25 to 45% by weight.

In an embodiment, clickable waterborne polyester with alkyne groups and clickable waterborne polyesters with azide groups (e.g., an aqueous dispersion of such polyesters) are synthesized by step-growth polymerization comprising a) reacting (i) diol, (ii) dicarboxylic acid and/or anhydride, hydrophilic diacid or triacid (e.g., (iii) 5-sulfoisophthalic acid sodium) and (iv) clickable diol with alkyne or azide groups together at, for example, a temperature of 150-200° C. until reaching a constant theoretical acid value, b) reducing the temperature to, for example, 50° C. and deionized water is added to the reaction mixture with vigorous stirring to get polyester dispersions sample.

Figure 23:
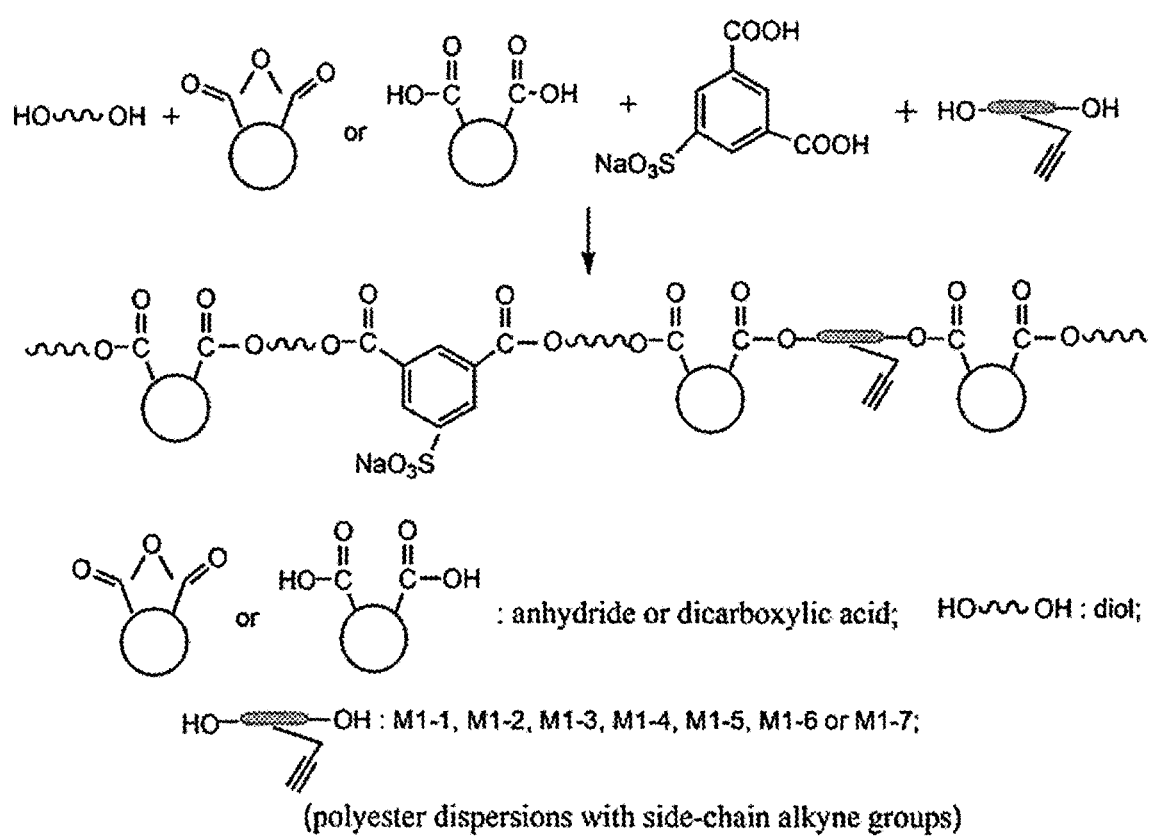
FIG. 23 shows examples of synthesis of clickable polyester dispersions with azide groups.
Figure 23:
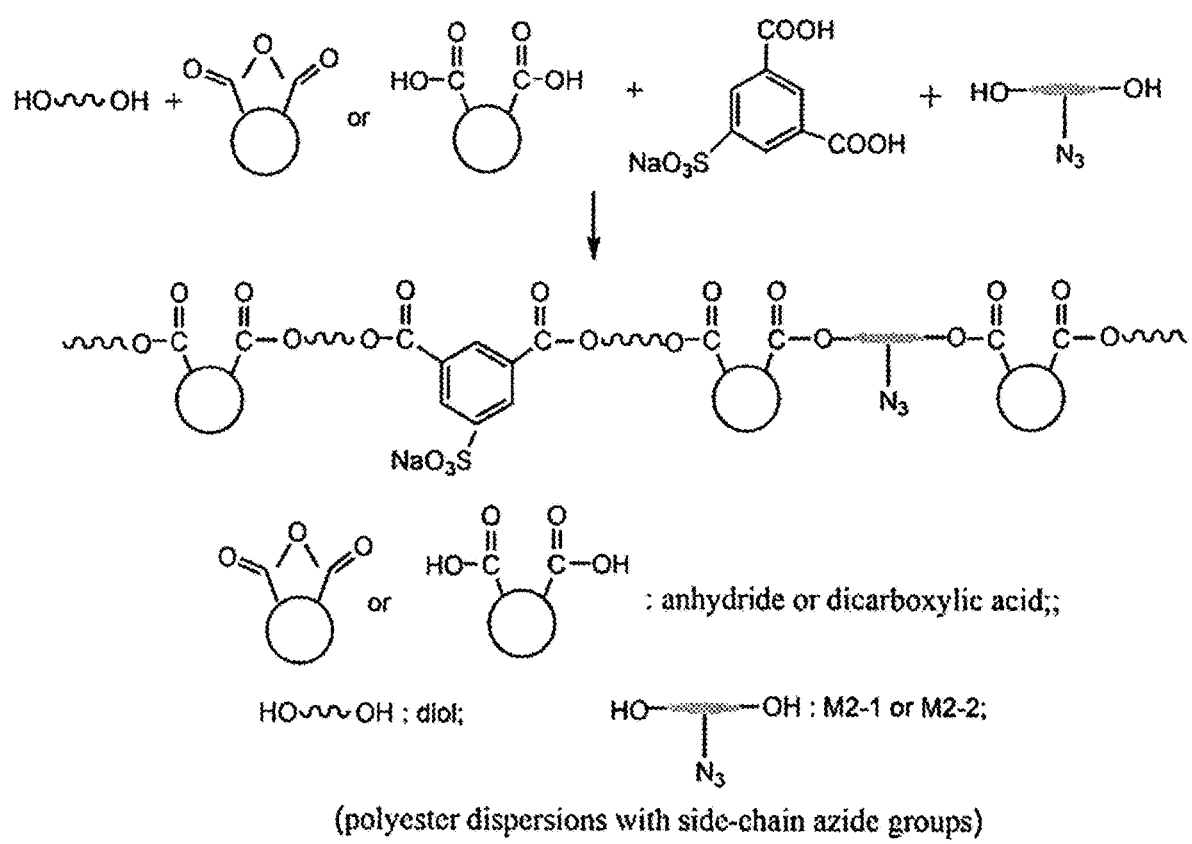

For example, clickable polyester dispersions with alkyne groups and clickable polyester dispersions with azide groups are synthesized by step-growth polymerization having the synthesis processes as P1-2 and P2-2, respectively, as shown in FIG. 23.

According to P1-2 and P2-2, the polyester dispersions with alkyne or azide groups are prepared by reacting (i) diol, (ii) dicarboxylic acid and/or anhydride, (iii) 5-sulfoisophthalic acid sodium as hydrophilic difunctional acid and (iv) clickable diol with alkyne or azide groups together at the temperature of 150-200° C. until reaching a constant theoretical acid value, then the temperature is reduced to 50° C. and deionized water is added to the reaction mixture with vigorous stirring to get polyester dispersions sample.

Examples of suitable diols include, for example, 1,2-ethylene glycol, diethylene glycol, triethylene glycol, tetraethylene glycol, 1,2-propylene glycol, dipropylene glycol, tripropylene glycol, 1,3-propanediol, 1,3-butanediol, 1,4-butanediol, 1,5-pentane diol, 1,6-hexanediol, neopentyl glycol, 1,4-cyclohexanedimethanol, 1,4-cyclohexanediol, butenediol, butynediol, and 1,8-octanediol. Preferred diols are single or in a combination of two and are selected from 1,2-ethylene glycol, 1,2-propylene glycol, 1,3-butane diol, 1,5-pentane diol, 1,6-hexane diol, and combinations thereof. The clickable diols with alkyne groups may be employed singly or in a combination of two or more.

The diol used in amount is 15% to 45% by weight, including all integer % by weight values and ranges therebetween, based on the solid weight of the polyester, preferably, 20% to 40% by weight based on the total solid weight of polyester.

Examples of anhydride or dicarboxylic acid include phthalic anhydride, tetrahydrophthalic anhydride, hexahydrophthalic anhydride, succinic acid, glutaric acid, dimethyl glutaric acid, adipic acid, dimethyl adipic acid, phthalic acid, isophthalic acid, 5-tert-butyl isophthalic acid, terephthalic acid, dimethyl terephthalic acid, 2,6-naphthalene dicarboxylic acid, and mixtures thereof. The preferred anhydride or dicarboxylic acid are phthalic anhydride, tetrahydrophthalic anhydride, mixtures of phthalic acid and terephthalic acid.

The total amount of anhydride and dicarboxylic acid used in amount is 25% to 65% by weight, including all integer % by weight values and ranges therebetween, based on the solid weight of the polyester. Preferably the total amount of anhydride and dicarboxylic acid used is 30% to 60% by weight based on the total solid weight of polyester.

A hydrophilic diacid or triacid (e.g., 5-sulfoisophthalic acid sodium) is used in amount of 10% to 20% by weight, including all integer % by weight values and ranges therebetween, based on the total solid weight of polyester.

With regard to the preparation for polyester dispersions with alkyne groups (e.g., P1-2), clickable diols with alkyne groups include, for example, M1-1, M1-2, M1-3, M1-4, M1-5, M1-6 and M1-7. The preferred clickable diols with alkyne groups include M1-1, M1-2, and M1-3. These clickable diols with alkyne groups may be employed singly or in a combination of two or more. The clickable diols with alkyne groups used in amount is 0% to 20% by weight including all integer % by weight values and ranges therebetween, based on the total solid weight of polyester. In various examples, the clickable diols with alkyne groups used in amount is 0.1% to 20%, 0.01% to 20%, or 5% to 20% by weight, including all integer % by weight values and ranges therebetween, based on the total solid weight of polyester.

With regard to the preparation for polyester dispersions with azide groups (e.g., P2-2), clickable diols with azide groups include, for example, one or two types from M2-1 and M2-2. The clickable diols with azide groups used in amount is 0% to 20% by weight including all integer % by weight values and ranges therebetween, based on the total solid weight of polyester. In various example, the clickable diols with azide groups used in amount is 0.1% to 20%, 0.01% to 20%, or 5% to 20% by weight, including all integer % by weight values and ranges therebetween, based on the total solid weight of polyester.

The clickable polyester dispersions with alkyne groups or clickable polyester dispersions with azide groups synthesized are stable, aqueous dispersions of polyester particles having a solid content of up to 60% by weight, preferably 35 to 55% by weight.

In an embodiment, clickable waterborne polyacrylates with alkyne groups and clickable polyacrylates with azide groups (e.g., an aqueous dispersion of such polyacrylates) are synthesized by free-radical polymerization comprising a) reacting (i) alkyl methacrylate, (ii) alkyl acrylate, (iii) methacrylic acid, (iv) clickable vinyl monomers with alkyne or azide groups at a temperature of, for example, 60-90° C., wherein the reacting is carried out using surfactants and initiators through free-radical emulsion polymerization in an aqueous solvent (e.g., water).

Figure 24:
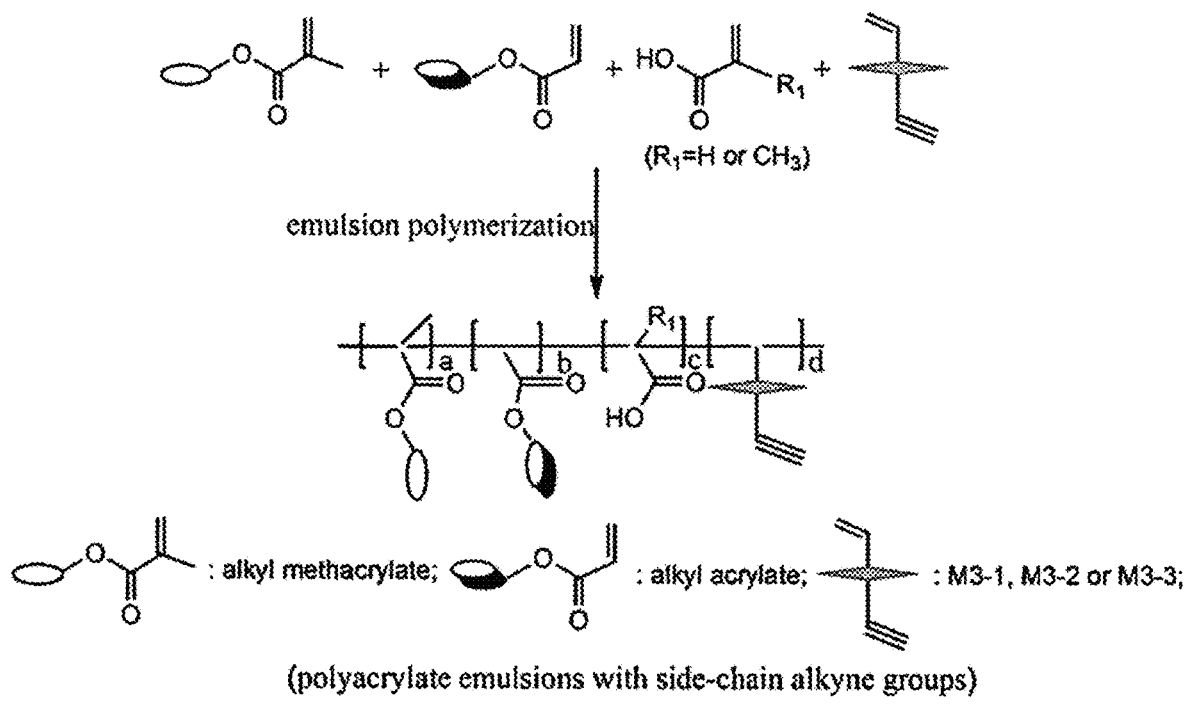
FIG. 24 shows examples of synthesis of clickable polyacrylate emulsions with azide groups.
Figure 24:
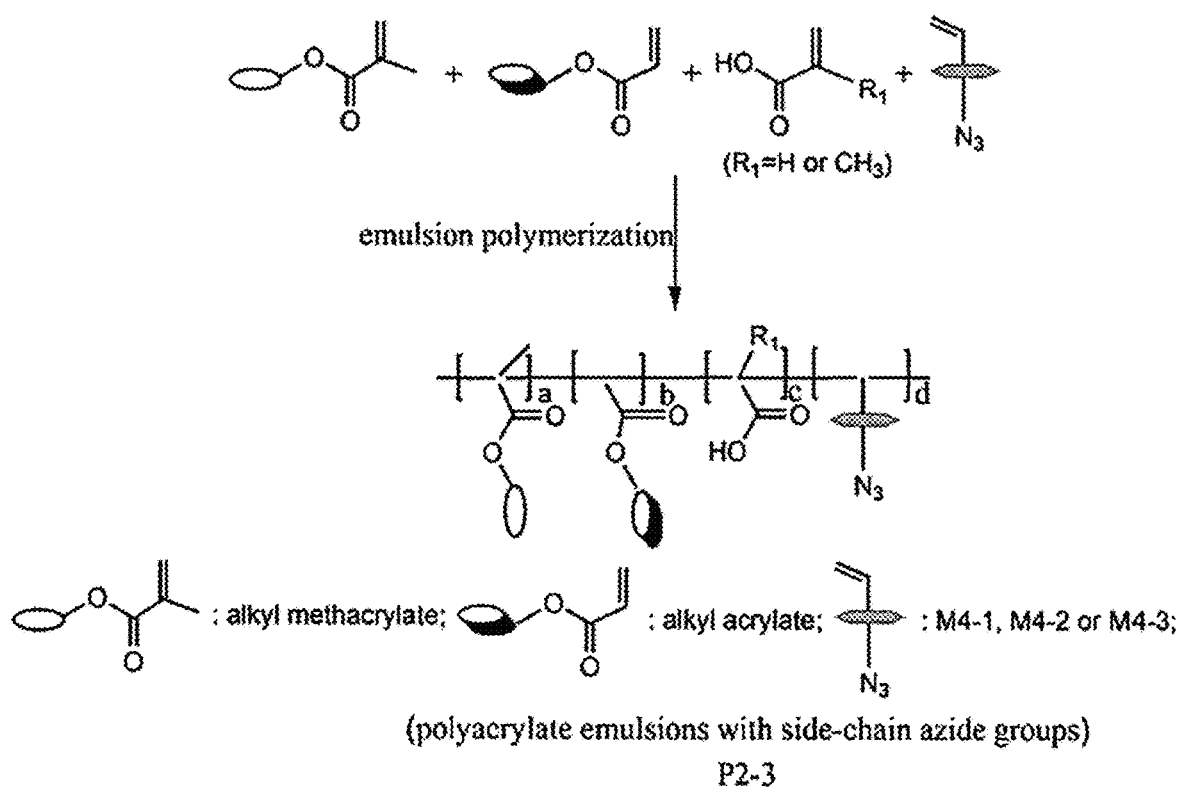

For example, clickable polyacrylate emulsions with alkyne groups and clickable polyacrylate emulsions with azide groups synthesized by free-radical polymerization having the synthesis processes as P1-3 and P2-3, respectively, as shown in FIG. 24.

According to P1-3 and P2-3, the polyacrylate emulsions with alkyne or azide groups are synthesized by reacting (i) alkyl methacrylate, (ii) alkyl acrylate, (iii) methacrylic acid and (iv) clickable vinyl monomers with alkyne or azide groups at the temperature of 60-90° C., with the use of surfactants and initiators through free-radical emulsion polymerization in water.

Examples of alkyl methacrylates include, for example, methyl methacrylate, ethyl methacrylate, or propyl methacrylate, and lauryl methacrylate.

The alkyl methacrylate used is 25% to 55% by weight, including all integer % by weight values and ranges therebetween, based on the solid weight of the polyacrylate. Preferably, the alkyl methacrylate used is 30% to 50% by weight based on the total solid weight of polyacrylate.

Examples of alkyl acrylate include methyl acrylate, ethyl acrylate, propyl acrylate, butyl acrylate, pentyl acrylate, hexyl acrylate, ethyl hexyl acrylate, and mixtures thereof. The preferred alkyl acrylates are ethyl acrylate, butyl acrylate, and ethyl hexyl acrylate.

The alkyl acrylate used is 20% to 65% by weight, including all integer % by weight values and ranges therebetween, based on the solid weight of polyacrylate. Preferably, the alkyl acrylate used is 25% to 60% by weight based on the total solid weight of polyacrylate.

Acrylic acid or methacrylic acid used is 1-5%, including all integer % by weight values therebetween, by weight based on the total solid weight of polyacrylate.

With regard to the preparation for polyacrylate emulsions with alkyne groups (e.g., P1-3), clickable vinyl monomers with alkyne groups include M3-1, M3-2 and M3-3, which may be employed singly or in a combination of two. The clickable vinyl monomers with alkyne groups used is 0% to 15%, including all integer % by weight values and ranges therebetween, by weight based on the total solid weight of polyacrylate. In various examples, the clickable vinyl monomers with alkyne groups used is 0.1% to 15%, 0.01% to 15%, or 5% to 15% by weight, including all integer % by weight values and ranges therebetween, by weight based on the total solid weight of polyacrylate.

With regard to the preparation for polyacrylate emulsions with azide groups (e.g., P2-3), clickable vinyl containing monomers with azide groups include, for example, one or two types from M4-1, M4-2 and M4-3. These clickable vinyl containing monomers with alkyne groups may be employed singly or in a combination of two or more. The clickable vinyl containing monomers with azide groups used is 0% to 15% by weight, including all integer % by weight values and ranges therebetween, based on the total solid weight of polyacrylate. In various examples, the clickable vinyl containing monomers with azide groups used is 0.1% to 15%, 0.01% to 15%, or 5% to 15% by weight, including all integer % by weight values and ranges therebetween, based on the total solid weight of polyacrylate.

The surfactant component can comprise anionic surfactant and nonionic surfactant. The amount of surfactant, based on the weight of total polyacrylate solid, is 0.1% to 0.5%, including all 0.1% by weight values and ranges therebetween, for the anionic surfactant and 0.2% to 1.0%, including all 0.1% by weight values and ranges therebetween, for the nonionic surfactant. The anionic surfactant is, for example, a sodium laureth sulfate containing 2-5 moles of ethylene oxide. The nonionic surfactant is, for example, octylphenoxypolyethoxyethanol containing 12-20 moles of ethylene oxide.

Examples of initiators include persulfates (such as ammonium persulfate and sodium persulfate). The amount of initiator, based on the total solid weight of polyacrylate, is 0.1% to 1.0%, including all 0.1% by weight values therebetween.

The clickable polyacrylate emulsions with alkyne groups or clickable polyacrylate emulsions with azide groups synthesized are stable, aqueous dispersions of polyacrylate particles having a solid content of up to 65% by weight, preferably 35 to 55% by weight.

In an aspect, the present disclosure provides methods of making crosslinked waterborne polymers. For example, the clickable waterborne polymers are polyurethane, polyester, or polyacrylate polymer mixtures with at least one first pendant group comprising an azide group and at least one second pendant group comprising an alkyne group.

Figure 25:
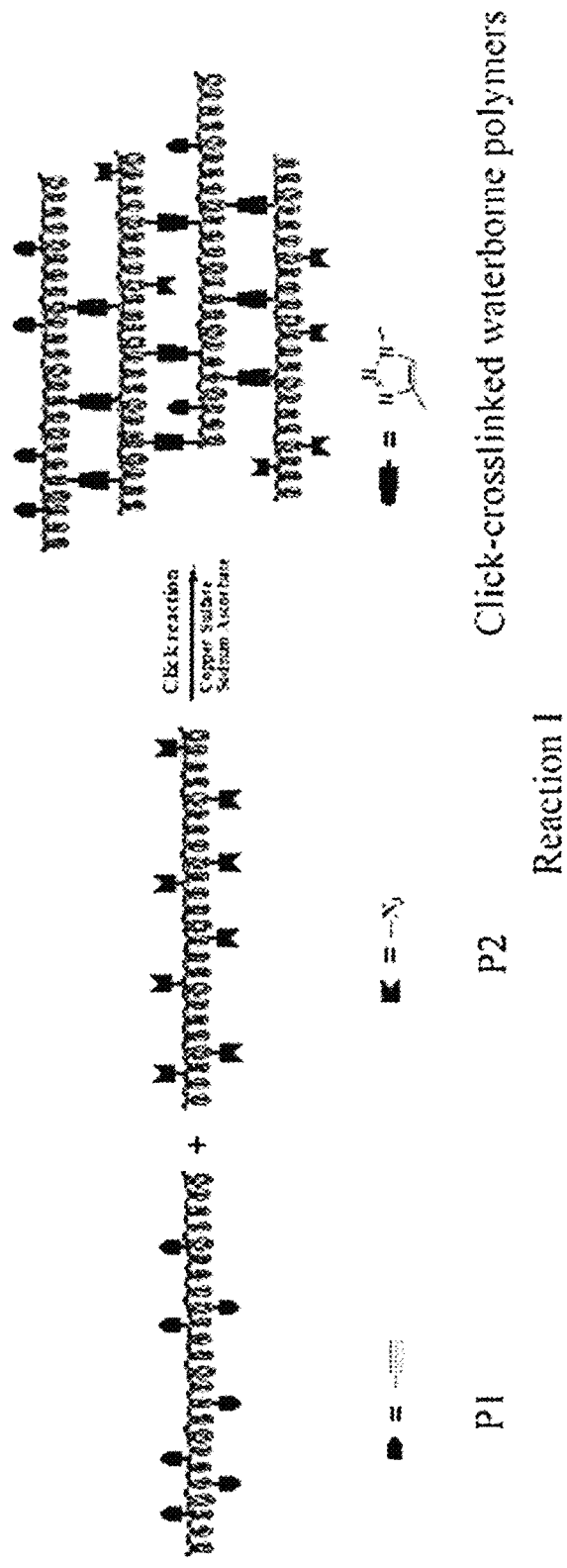
FIG. 25 shows examples of click crosslinking of clickable waterborne polymer with pendant groups bearing alyne groups.

The methods use a process that can be described as waterborne polymer click crosslinking, wherein a clickable waterborne polymer with pendant groups bearing alkyne groups (P1) is click-crosslinked with a corresponding clickable waterborne polymer with pendant groups bearing azide groups (P2) in the presence of, for example, copper sulfate/copper chloride and sodium ascorbate as catalyst systems. The click crosslinking is presented as Reaction I as shown in FIG. 25.

In an embodiment, a method of crosslinking a clickable waterborne polymer or polymer mixtures (e.g., a clickable polyurethane, polyester, or polyacrylate polymer) comprises contacting a clickable waterborne polymer having pendant groups comprising at least one azide group and a clickable waterborne polymer having pendant groups comprising at least one alkyne group. With the help of copper (I) catalyst systems, azide and alkyne groups can react each other at room temperature in aqueous medium with the formation of 1,4-triazole rings. Copper (I) catalyst systems include cuprous salts such as copper(I) chloride (Cu(I)Cl), copper(I) bromide (Cu(I)Br), and cuprous acetate (Cu(I)OAc); in situ Cu(I) catalyst systems such as copper sulfate-sodium ascorbate (Cu(II)SO$_4$-NaLAc) or copper chloride-sodium ascorbate (Cu(II)Cl$_2$-NaLAc); and copper nanoparticles, Cu(0)-C nanoparticles, or Cu(0)-cupric salt system such as Cu/Cu(OAc)$_2$, disproportionation reaction between Cu(0) and Cu(II) gives out Cu(I) ions. Chelating agents/ligands such as L-histidine, 2,2'-bipyridine, triethylamine (TEA) or other bases can be used as an assistant to speed up the reaction of CuAAC. The 1,4-triazole(s) on crosslinked polymer (e.g., a crosslinked polyurethane, polyester, or polyacrylate polymer) is/are formed by the reaction of a pendant group comprising an azide group and a pendant group comprising an alkyne group. The pendant group comprising an azide group and pendant group comprising an alkyne group can be on the same polymer chain or different polymer chains. Click chemistry, especially CuAAC, is an effective and site-specific surface/interface reaction that can be used as an bioconjugation method, which is tolerable to water, oxygen, and a wide range of functionalities and proceeded with almost quantitative yields under mild conditions in different reaction media, including water. Moreover, the triazole rings resulted by, for example, CuAAC, can imitate the functions of amide bonds (e.g., serve as an isostere) and serve as a mechanical strength promotion route.

In an aspect, the present disclosure provides click-cross-linked waterborne polymers. The crosslinked waterborne polymers have one or more crosslinking groups where the cross linking group comprises a triazole. In an embodiment, the bonds to the triazole in the crosslinking group are to the 1 and 4 positions of the 1,2,3-triazole (i.e., the 1,2,3-triazole is a 1,4-substituted 1,2,3-triazole, or can be named as 1,4-triazole). In an embodiment, the click-crosslinked waterborne polymers are made by a method disclosed herein. The click-crosslinked waterborne polymers possess improved mechanical strength, water and chemical resistance, thermal resistance, wear-resistance and scrubbability, etc.

In an aspect, the present disclosure provides clickable functional compounds comprising an alkyne or azide. For example, the clickable functional compounds exhibit antimicrobial or infrared-refractive function.

Figure 26:
FIG. 26 shows examples of schematic structures of clickable functional compounds with alyne or azide groups.

The clickable functional compounds can be synthesized via the clickable modification of functional compounds, for example, antimicrobial or infrared-refractive compounds, with azide or alkyne groups. Schematic structures of clickable functional compounds with alkyne or azide groups are presented as F, as shown in FIG. 26.

Figure 27:
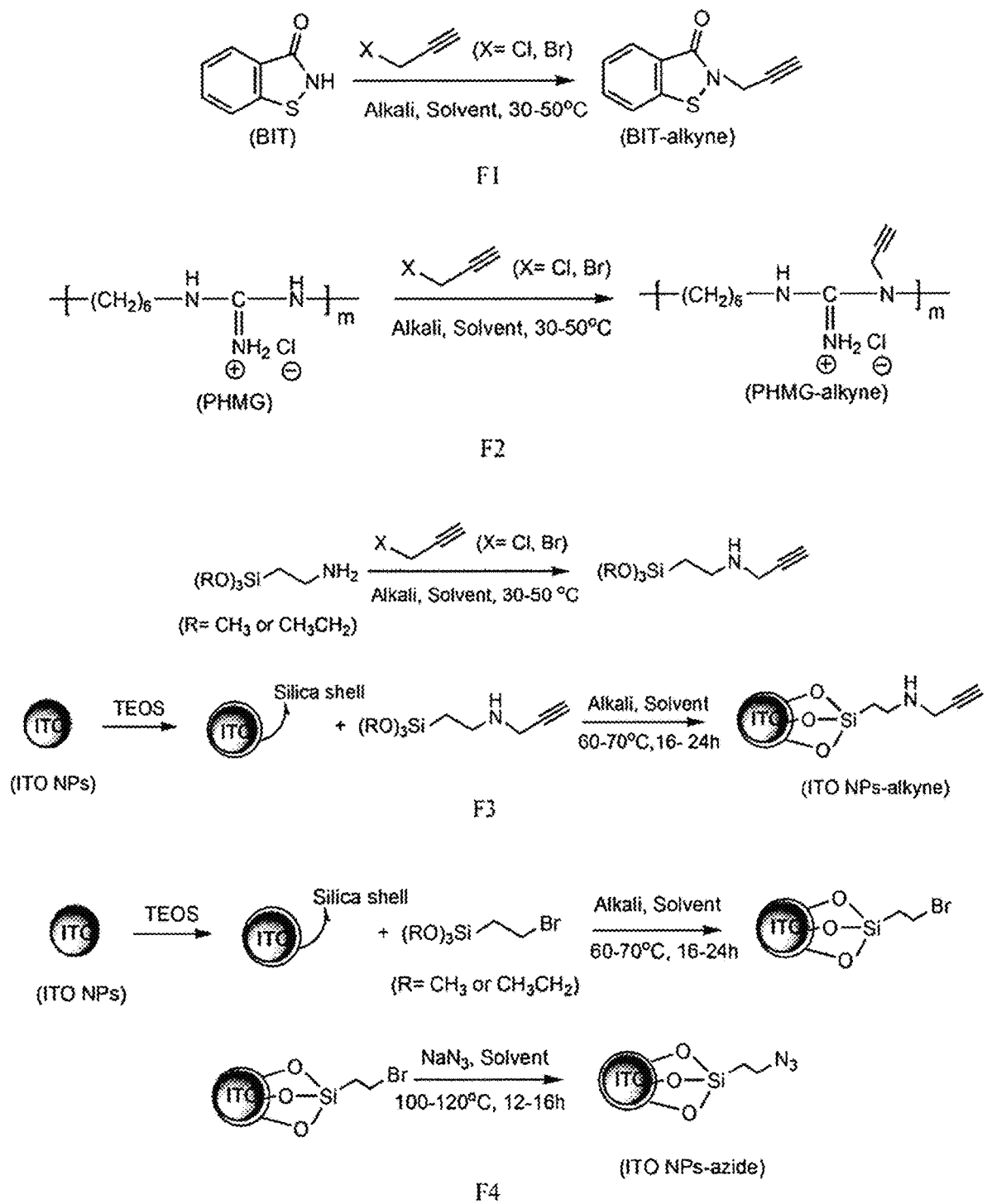
FIG. 27 shows examples of clickable functional compounds.

For example, the functional compounds are benzisothiazolinone (BIT) with antimicrobial function, polyhexamethylene guanidine hydrochloride (PHMG) with antimicrobial function and indium tin oxide nanoparticles (ITO NPs) with infrared-refractive function. The clickable functional compounds, including alkyne modified benzisothiazolinone (BIT-alkyne), alkyne modified polyhexamethylene guanidine hydrochloride (PHMG-alkyne), and alkyne or azide modified indium tin oxide nanoparticles (ITO NPs-alkyne or ITO NPs-azide), are synthesized, for example, as formula F1, F2, F3 and F4, respectively, as shown in FIG. 27.

BIT-alkyne is prepared by reacting (i) BIT, (ii) 3-halo-propynyl, such as 3-chloro-propynyl, and 3-bromo-propynyl at the molar ratio of BIT to 3-halo-propynyl as 1:1.1-2.0, in (iii) suitable solvent, such as such as methanol, ethanol, isopropanol, diethyl ether, tetrahydrofuran and DMF, with the catalysis of (iii) alkali, such as sodium hydride, sodium hydroxide, sodium methoxide and sodium ethoxide at a temperature of 30-50° C. for 16-24 hours.

PHMG-alkyne is prepared by reacting (i) PHMG, (ii) 3-halo-propynyl, such as 3-chloro-propynyl, and 3-bromo-propynyl at the molar ratio of PHMG to 3-halo-propynyl as 1:1.1-2.0, in (iii) suitable solvent, such as such as methanol, ethanol, isopropanol, diethyl ether, tetrahydrofuranaxbnd DMF, with the catalysis of (iii) alkali, such as sodium hydride, sodium hydroxide, sodium methoxide and sodium ethoxide at a temperature of 30-50° C. for 16-24 hours.

ITO NPs-alkyne is prepared as follows: Firstly, the alkyne functional 3-aminopropyl-trialkoxysilane is synthesized by reacting (i) 3-aminopropyl-trialkoxysilane, such as 3-aminopropyl-triethoxysilane, and 3-aminopropyl-trimethoxysilane, (ii) 3-halo-propynyl, such as 3-chloro-propynyl, and 3-bromo-propynyl, at the molar ratio of 3-aminopropyl-trialkoxysilane to 3-halo-propynyl as 1:1.1-2.0, in (iii) suitable solvent, such as methanol, ethanol, isopropanol, diethyl ether, tetrahydrofuran and DMF, with the catalysis of (iv) alkali, such as sodium hydride, sodium hydroxide, sodium methoxide and sodium ethoxide at a temperature of 30-50° C. for 16-24 hours; Secondly, ITO NPs with silica shell treatment is prepared by disperse ITO NPs in water, followed by the addition of tetraethyl orthosilicate (TEOS), and vigorous stirred for 24 hours; Thirdly, ITO NPs-alkyne is prepared by reacting the alkyne functionalized 3-aminopropyl-trialkoxysilane and ITO NPs with silica shell treatment prepared above, in (iii) suitable solvent, such as such as methanol, ethanol, isopropanol, diethyl ether, tetrahydrofuran and DMF, with the catalysis of (iv) alkali, such as sodium hydride, sodium hydroxide, sodium methoxide and sodium ethoxide at a temperature of 60-70° C. for 16-24 hours.

ITO NPs-azide is prepared as follows: Firstly, ITO NPs with silica shell treatment is prepared by dispersing ITO NPs in water, followed by the addition of tetraethyl orthosilicate (TEOS), and vigorous stirring the resulting mixture for 24 hours; secondly, ITO NPs-bromine is prepared by reacting (i) 3-bromopropyl-trialkoxysilane, such as 3-bromopropyl-triethoxysilane and 3-bromopropyl-trimethoxysilane, and ITO NPs with silica shell treatment prepared above, in (ii) suitable solvent, such as methanol, ethanol, isopropanol, diethyl ether, tetrahydrofuran and DMF, with the catalysis of (iii) alkali, such as sodium hydride, sodium hydroxide, sodium methoxide and sodium ethoxide at a temperature of 60-70° C. for 16-24 hours; thirdly, ITO NPs-azide is prepared by reacting the ITO NPs-bromine prepared above and sodium azide ($NaN_3$), in (iv) suitable solvent, such as ethyl acetate, tetrahydrofuran and DMF at a temperature of 100-120° C. for 12-16 hours.

In an aspect, the present disclosure provides waterborne polymers comprising one or more pendant clickable groups covalently bound to the polymer backbone by a linking group comprising a 1,4-triazole (i.e., functionalized waterborne polymers).

The waterborne polymers comprising one or more pendant functional molecules covalently bound to the polymer backbone by a linking group comprising a 1,4-triazole can be synthesized using a process of click reaction between waterborne polymer and clickable functional compounds, wherein a clickable waterborne polymer with pendant groups bearing alkyne groups (P1) click-reacted with a clickable functional compound with azide groups (FG-azide), or a clickable waterborne polymer with pendant groups bearing azide groups (P2) click-reacted with a clickable functional compound with alkyne groups (FG-alkyne) catalyzed by, for example, copper sulfate/copper chloride and sodium ascorbate. In an embodiment, the bonds to 1,2,3-triazole in the linking group are to the 1 and 4 positions of the 1,2,3-triazole (i.e., the 1,2,3-triazole is a 1,4-substituted 1,2,3-triazole, or can be named as 1,4-triazole).

In an embodiment, the waterborne polymer is a polyurethane, polyester, or polyacrylate polymer having at least one clickable group, wherein the clickable groups comprises a 1,2,3-triazole (e.g., a 1,4-substituted 1,2,3-triazole) with the help of copper (I) catalyst systems.

Figure 28:
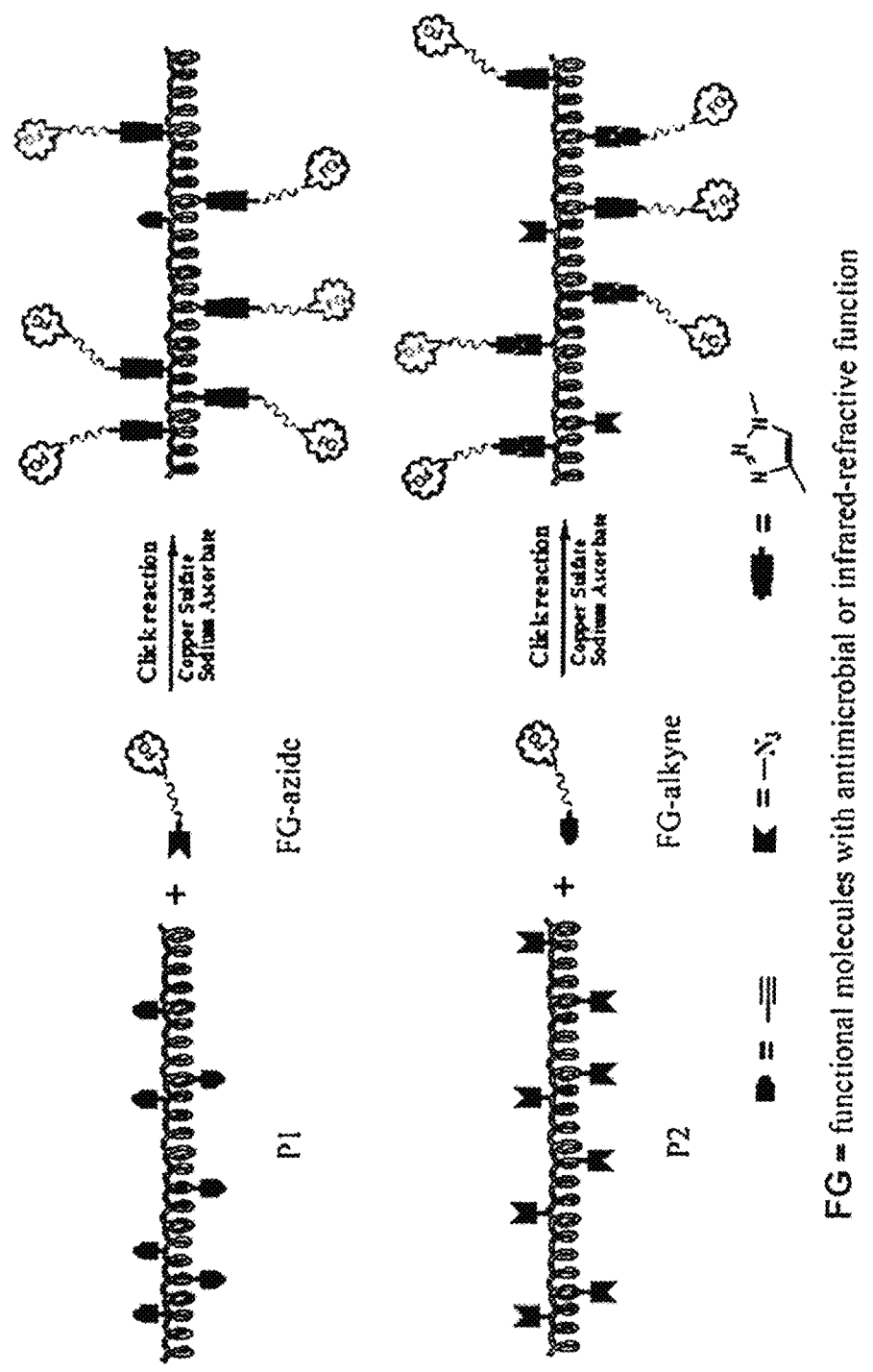
FIG. 28 shows an example of click reaction between clickable waterborne polymer and clickable functional compound.

The click reaction between clickable waterborne polymer and clickable functional compound is presented as Reaction II as shown in FIG. 28.

The steps of the methods of making the various polymers and using the various polymers described in the various embodiments and examples disclosed herein are sufficient to carry out the methods of the present disclosure. Thus, in an embodiment, a method consists essentially of a combination of the steps of the methods disclosed herein. In another embodiment, the method consists of such steps.

The polymers of the present disclosure can have various end groups terminating individual polymer chains. The end groups of an individual polymer chain can be the same or different. The end groups can be those typical for polyurethane, polyester, or polyacrylate polymers. Examples of end groups are known in the art. For example, the end group can be
—NCO, —OH, —NH$_2$, or a combination thereof for polyurethane; —OH, —COOH, or a combination thereof for polyester; the terminals of polyacrylate can be any of the monomers used with double bond opened.

The polymers of the present disclosure can have a wide range of molecular weight. For example, the polymers have a molecular weight ($M_n$ or $M_w$) of 6 to 120 KDa, including all integer values and ranges therebetween, and/or a polydispersity index (PDI) of 1.5 to 15, including all 0.1 values and ranges therebetween. The molecular weight and polydispersity index of a polymer can be determined by methods known in the art. For example, the molecular weight and polydispersity index (PDI) of a polymer can be determined by gel permeation chromatography (GPC).

In an aspect, the present disclosure provides compositions comprising a clickable waterborne polymer, a crosslinked waterborne polymer, and/or functionalized waterborne polymer. The composition can comprise combinations of waterborne polymers. For example, the compositions are aqueous compositions. Typically, the compositions (e.g., coatings and/or adhesives) include cosolvent(s) (acetone, propylene glycol methyl ether acetate) and/or additive(s) (mar resistance agent, defoaming agent, adhesion promotion agent, leveling agent, wetting agent, pigment, texturing agent, etc.)

In an aspect, the present disclosure provides uses of the waterborne polymers. For example, the waterborne polymers are used in waterborne coatings and adhesives. Examples of such coatings and adhesives include, but are not limited to, exterior and interior coatings, coil coatings, marine coatings, leather coatings, wood coatings, textile coatings, plastic coatings, metal anticorrosive coatings and shoes coatings, plastic laminating adhesives, paper laminating adhesives, wood structural adhesives, and tissue adhesives. Except coating and adhesives, the aqueous suspensions of waterborne polymers can also be used directly as drug delivery systems, or can be crosslinked into hydrogels or composites for biomedical applications in drug/cell delivery or bone regeneration or medical device fabrication such as medical tubing, catheter, and implantable devices.

In the following Statements, various examples of the polymers, methods, and devices of the present disclosure are described:

1. A polyurethane, polyester, or polyacrylate polymer (e.g., a clickable polyurethane, polyester, or polyacrylate polymer) having at least one first pendant group comprising an azide group or alkyne group.

2. A polyurethane, polyester, or polyacrylate polymer of Statement 1, where the polymer has at least one first pendant group comprising an azide group and at least one second pendant group comprising an alkyne group.

3. A polyurethane, polyester, or polyacrylate polymer of any one of Statements 1 or 2, where the polyurethane polymer or polyester polymer has 0 to 20% or x % (0<x≤20) (e.g. 0.1 to 20%, 0.01 to 20%, or 5 to 20%) by weight alkyne groups and/or azide groups.

4. A polyurethane, polyester, or polyacrylate polymer of any one of Statements 1 or 2, where the polyacrylate polymer has 0 to 15% or x % (0<x≤15) (e.g., 0.1 to 15%, 0.01 to 15%, or 5 to 15%) by weight alkyne groups and/or azide groups.

5. A polyurethane, polyester, or polyacrylate polymer having at least one crosslinking group (e.g., crosslinking groups accounting for 0 to 20% or x % (0<x≤20) (e.g. 0.1 to 20%, 0.01 to 20%, or 5 to 20%) for polyurethanes or polyesters or crosslinking groups accounting for 0 to 15% or x % (0<x≤15) (e.g., 0.1 to 15%, 0.01 to 15%, or 5 to 15%) by weight for polyacrylates), where the crosslinking group comprises a 1,2,3-triazole.

6. A method of making clickable waterborne polyurethanes with alkyne groups and clickable waterborne polyurethanes with azide groups (e.g., synthesis by step-growth polymerization (P1-1 and P2-1)) comprising a) reacting (i) a diisocyanate with (ii) macromolecular polyol (e.g., at for example 70-90° C.), b) adding (iii) an carboxylic acid diol (e.g., dimethylol propionic acid) to the product from a) to introduce carboxylic acid groups, c) adding (iv) clickable diol bearing alkyne or azide group(s) (e.g., M1-1, M1-2, M1-3, M1-4, M1-5, M1-6, or M1-7, or a combination thereof, or M2-1, M2-2, or a combination thereof) to the product from b) to modify polyurethane with clickable reactive groups; d) adding a base (e.g., (v) trimethylamine or triethylamine), at for example, 30-45° C., to neutralize carboxylic acid (i.e., to form an ammonium salt) to render the resulting polyurethane dispersible in water, and e) adding a chain extender (e.g., (vi) ethylenediamine) to the product from f), at, for example, room temperature in water phase.

7. A method of making clickable waterborne polyesters with alkyne groups and clickable waterborne polyesters with azide groups (e.g., an aqueous dispersion of such polyesters) (e.g., synthesis by step-growth polymerization) comprising a) reacting (i) diol, (ii) dicarboxylic acid and/or anhydride, hydrophilic diacid or triacid (e.g., (iii) 5-sulfoisophthalic acid sodium) and (iv) clickable diol with alkyne or azide groups (e.g., M1-1, M1-2, M1-3, M1-4, M1-5, M1-6, or M1-7, or a combination thereof, or M2-1, M2-2, or a combination thereof) together at, for example, a temperature of 150-200° C. until reaching a constant theoretical acid value, b) reducing the temperature, to, for example, 50° C., and adding deionized water to the reaction mixture with vigorous stirring to provide a polyester dispersions sample.

8. A method of making clickable waterborne polyacrylates with alkyne groups and clickable polyacrylates with azide groups (e.g., an aqueous dispersion of such polyacrylates) (e.g., synthesis by free-radical polymerization) comprising a) reacting (i) alkyl methacrylate, (ii) alkyl acrylate, (iii) methacrylic acid, (iv) clickable vinyl monomers with alkyne or azide groups (e.g., M3-1, M3-2, M3-3, or a combination thereof, or M4-1, M4-2, M4-3, or a combination thereof) at a temperature of, for example, 60-90° C., where the reacting is carried out using surfactant(s) and initiator(s) through free-radical emulsion polymerization in an aqueous solvent (e.g., water).

9. A method of crosslinking a polyurethane, polyester, or polyacrylate polymer comprising: a) contacting a polyurethane, polyester, or polyacrylate polymer having at least one first pendant group comprising an azide group and at least one second pendant group comprising an alkyne group with a copper(I) catalyst under conditions such that a crosslinking group comprising a 1,2,3-triazole is formed.

10. A method of crosslinking a polyurethane, polyester, or polyacrylate polymer of Statement 9, where the polyurethane polymer or polyester polymer has 0.1 to 20%, 0.01 to 20%, 5 to 20%, or 0 to 20% by weight alkyne groups and/or azide groups.

11. A method of crosslinking a polyurethane, polyester, or polyacrylate polymer of Statement 9 where the polyacrylate polymer has 0.1 to 15%, 0.01 to 15%, 5 to 15%, or 0 to 15% by weight alkyne groups and/or azide groups.

12. A method of crosslinking a polyurethane, polyester, or polyacrylate polymer of Statement 9, where the contacting is carried out in an aqueous medium.

13. A method of crosslinking a polyurethane, polyester, or polyacrylate polymer of any one of Statements 9 to 12, where the contacting is carried out at room temperature.

14. A method of crosslinking a polyurethane, polyester, or polyacrylate polymer of any one of Statements 9 to 13, where the copper(I) catalyst is formed in situ.

15. A functionalized polyurethane, polyester, or polyacrylate polymer comprising at least one functional molecule (e.g., antimicrobial compounds and infrared-refractive compounds (e.g., infrared-reactive nanoparticles)) linked to the polymer backbone via a linking group comprising a 1,2,3-triazole.

16. A composition comprising a polyurethane, polyester, and/or polyacrylate polymer of any one of Statements 1 to 4 and/or a polyurethane, polyester, and/or polyacrylate polymer of Statement 5 and/or a functionalized polyurethane, polyester, and/or polyacrylate polymer of Statement 15.

17. A composition of Statement 16, where the composition is a coating or adhesive composition.

The following examples are presented to illustrate the present disclosure. They are not intended to limiting in any matter.

EXAMPLE 1

Example of Synthesis of Clickable Diols with Alkyne Groups (M1-1) and Clickable Diols with Azide Groups (M2-3).

Propargyl 2,2-bis(hydroxylmethyl) propionate (M1-1) was synthesized according to Lu et al., J. Polym. Sci. Part A: Polym. Chem. 2007, 45, 3204-3217, and Shi et al., Biomaterials 2008, 29, 1118-1126. Briefly, 26.8 g 2,2-bis(hydroxymethyl) propionic acid (0.2 mol) and 12.8 g KOH (more than 0.2 mol) were added to 150 mL of dried N,N-dimethylformamide (DMF), the mixture was stirred at 100° C. for 2 hours until a transparent solution was formed. The reaction temperature was then reduced to 45° C., followed by the addition of 24.7 mL propargyl bromide (0.217 mol, 80 wt % solution in toluene), the mixture was then reacted at 45° C. for another 72 hours. After removing DMF and excess propargyl bromide under vacuum at 80-120° C., the crude product was dissolve in 30 mL of DI water, and extracted with dichloromethane (DCM) or chloroform (100 mL×4), the combined organic phase was dried by anhydrous $MgSO_4$ or $Na_2SO_4$, filtered and the solvent was removed by rotary evaporation, the final product (yellow liquid) was then put under vacuum for at least 3 days before use.

2,2-Bis(azidomethyl)propane-1,3-diol (M2-3) was synthesized as described in Zhang et al., Macromolecules 2011, 44, 1755-1759, and Xu et al., Macromolecules 2011, 44, 2660-2667. Briefly, 40 g 2,2-bis(bromomethyl) propane-1,3-diol (150 mmol) and 40 g sodium azide (NaN3, 620 mmol) were mixed in 150 mL N, N-dimethylformamide (DMF). The mixture was stirred at 120° C. overnight. After removing DMF under vacuum at 80-120° C., the crude product was then dissolved in acetone, the solid byproduct KBr salt and excess $NaN_3$ were filtered and the solvent was removed by rotary evaporation. The crude product was then dissolved in diethyl ether or dichloromethane (DCM) (200 mL), and extract by saturated NaCl solution (50 mL×3). The organic phase was separated and dried by anhydrous $MgSO_4$ or $Na_2SO_4$, filtered and the solvent was removed by rotary evaporation, the final product (yellow liquid) was then put under vacuum for at least 3 days before use.

EXAMPLE 2

Example of Synthesis of Clickable Vinyl Monomers with Alkyne Groups (M3-1) and Clickable Vinyl Monomers with Azide Groups (M4-5)

Propargyl acrylate (M3-1) was synthesized according to Malkochet. al., J. Am. Chem. Soc. 2005, 127, 14942-14949. Briefly, 14.43 mL propargyl alcohol (0.25 mol) and 34.85 mL triethylamine (TEA, 0.25 mol) were added into 300 mL of dichloromethane (DCM) and the solution was cooled to 0° C. Acryloyl chloride (18.102 g, 0.2 mol) was then added slowly over a 30 minute period and stirring continued for an additional 16 hours at room temperature. The reaction mixture was washed with brine and water, dried over magnesium sulfate and concentrated under reduced pressure to give a pale yellow liquid.

4-azidomethyl styrene (M4-5) was synthesized according to Guoet. al., Adv. Healthcare Mater. 2013, 2, 784-789. Briefly, to the solution of $NaN_3$ (13.8 g, 212.9 mmol) and tetrabutyl ammonium bromide (TBAB, 0.75 g) in 30 mL of distilled water, 15 mL of distilled 4-Chloromethyl styrene (CMS, 106.4 mmol) was dropped in at room temperature. The reaction mixture was stirred at 50° C. under nitrogen atmosphere for 5 hours. Then the mixture was poured into 20 mL of ice water, and extracted with dichloromethane (DCM) for three times (100 mL×3). The combined organic phase was then dried over anhydrous $MgSO_4$, and DCM was removed using a rotary evaporator. The product was obtained as a brown yellow liquid.

EXAMPLE 3

Example of Synthesis of Non-Clickable Waterborne Polyurethane (WPU 1), Waterborne Polyurethane with Pendant Groups Bearing Alkyne Groups (WPU-Alkyne 1) and Waterborne Polyurethane with Pendant Groups Bearing Azide Groups (WPU-Azide 1).

Non-clickable waterborne polyurethane (WPU 1), waterborne polyurethane with pendant groups bearing alkyne groups (WPU-alkyne 1) and waterborne polyurethane with pendant groups bearing azide groups (WPU-azide 1) were prepared with the following recipe:

|  | WPU 1 | | WPU-alkyne 1 | | WPU-azide 1 | |
| --- | --- | --- | --- | --- | --- | --- |
|  | Amount/g | Weight-% | Amount/g | Weight-% | Amount/g | Weight-% |
| Isophoronediisocyanate | 40.00 | 50.60 | 40.00 | 47.70 | 40.00 | 47.14 |
| Polypropylene glycol(Mn = 1000) | 25.00 | 31.63 | 25.00 | 29.82 | 25.00 | 29.46 |
| Dimethylol propionic | 3.50 | 4.43 | 3.50 | 4.17 | 3.50 | 4.12 |

|  | WPU 1 | | WPU-alkyne 1 | | WPU-azide 1 | |
| --- | --- | --- | --- | --- | --- | --- |
|  | Amount/g | Weight-% | Amount/g | Weight-% | Amount/g | Weight-% |
| 1,6-Haxanediol | 7.20 | 9.11 | 0 | 0.00 | 0 | 0 |
| Propargyl 2,2-bis(hydroxylmethyl) propionate (M1-1) | 0 | 0 | 12.00 | 14.31 | 0 | 0 |
| 2,2-Bis(azidomethyl)propane-1,3-diol (M2-3) | 0 | 0 | 0 | 0.00 | 13.00 | 15.32 |
| Triethylamine | 2.55 | 3.23 | 2.55 | 3.04 | 2.55 | 3.01 |
| Ethylenediamine | 0.8 | 1.01 | 0.8 | 0.95 | 0.8 | 0.94 |
| Total polymer | 79.05 | 100.00 | 83.85 | 100.00 | 84.85 | 100.00 |
| Water | 184.80 | — | 195.60 | — | 198.00 | — |
| Solid content, % | 29.96% | | 30.01% | | 30.00% | |

The waterborne polyurethane samples were prepared according to the above recipe and the following procedure. Firstly, isophoronediisocyanate (IPDI) and poly(propylene glycol) (PPG) were charged into a 250 mL dried four-necked flask with a mechanical stirrer, thermometer, condenser, and nitrogen in/outlet. The mixture was uniform after being stirred for 10 minutes, and increased the temperature to 85° C., maintained reaction for 2 hours. Then, dimethylol propionic and 1,6-haxanediol (for WPU1) or propargyl 2,2-bis(hydroxylmethyl) propionate (for WPU-alkyne 1) or 2,2-bis(azidomethyl) propane-1,3-diol (for WPU-azide 1) were added into the flask and kept reaction for 3-4 hours. The isocyanate (NCO) content was monitored during the reaction using the standard dibutylamine back titration method. Upon reaching the theoretical NCO value, started to decrease the temperature to 40° C., if the viscosity of prepolymer was high, 10 ml acetone could be added into flask. At last, triethylamine was added and stirred for 20 minutes at 40° C. to neutralize the prepolymer, and deionized water with ethylenediamine was added to the reaction mixture with vigorous stirring (about 1500 rpm) for 15 minutes and WPU 1, WPU-alkyne 1 or WPU-azide 1 were prepared.

EXAMPLE 4

Examples of Synthesis of Non-Clickable Polyester Dispersions (PED1), Polyester Dispersions with Pendant Groups Bearing Alkyne Groups (PED-Alkyne 1) and Polyester Dispersions with Pendant Groups Bearing Azide Groups (PED-Azide 1).

Non-clickable polyester dispersions (PED 1), polyester dispersions with pendant groups bearing alkyne groups (PED-alkyne 1) and polyester dispersions with pendant groups bearing azide groups (PED-azide 1) were prepared with the following recipe:

|  | PED 1 | | PED-alkyne 1 | | PED-azide 1 | |
| --- | --- | --- | --- | --- | --- | --- |
|  | Amount/g | Weight-% | Amount/g | Weight-% | Amount/g | Weight-% |
| 1,6-Hexane diol | 125.60 | 28.86 | 125.60 | 28.86 | 125.60 | 28.86 |
| 1,2-Propylene glycol | 35.30 | 8.11 | 0 | 0 | 0 | 0 |
| Propargyl 2,2-bis(hydroxylmethyl) propionate (M1-1) | 0 | 0 | 35.30 | 8.11 | 0 | 0 |
| 2,2-Bis(azidomethyl)propane-1,3-diol (M2-3) | 0 | 0 | 0 | 0 | 35.30 | 8.11 |
| Phthalic anhydride | 220.40 | 50.64 | 220.40 | 50.64 | 220.40 | 50.64 |
| 5-Sulfoisophthalic acid sodium | 53.95 | 12.40 | 53.95 | 12.40 | 53.95 | 12.40 |
| Total polymer | 435.25 | 100.00 | 435.25 | 100.00 | 435.25 | 100.00 |
| Water | 1015.00 | — | 1015.00 | — | 1015.00 | — |
| Solid content, % | 30.00% | | 30.00% | | 30.00% | |

The polyester dispersions samples were prepared according to the above recipe and the following procedure. Firstly, 1,6-hexane diol and 1,2-propylene glycol (for PED 1) or propargyl 2,2-bis(hydroxylmethyl) propionate (for PED-alkyne 1) or 2,2-bis(azidomethyl) propane-1,3-diol (for PED-azide 1), and phthalic anhydride, 5-sulfoisophthalic acid sodium were charged into a 1000 mL dried four-necked flask with a mechanical stirrer, thermometer, condenser, and nitrogen in/outlet. Then, the mixture was heated to 150° C. and kept reaction in molten state for 3 hours. In order to further improve the extent of reaction, 50 mL toluene was added to reflux at about 200° C. for about 10-12 hours. The reaction temperature was reduced to 160° C. and started to remove small molecules from the mixture under vacuum of −0.05 to −0.1 MPa for 2-3 hours. The acid value was monitored during the reaction using the standard method of ASTM D 974. Upon reaching a constant theoretical acid value, the temperature was reduced to 50° C. and deionized water was added to the reaction mixture with vigorous stirring (about 800-1000 rpm) for 30 min and PED 1, PED-alkyne 1 or PED-azide 1 were prepared.

EXAMPLE 5

Example of Synthesis of Non-Clickable Polyacrylate Emulsions (PAE 1), Polyacrylate Emulsions with Pendant Groups Bearing Alkyne Groups (PAE-Alkyne 1) and Polyacrylate Emulsions with Pendant Groups Bearing Azide Groups (PAE-Azide 1).

Non-clickable polyacrylate emulsions (PAE 1), polyacrylate emulsions with pendant groups bearing alkyne groups (PAE-alkyne 1) and polyacrylate emulsions with pendant groups bearing azide groups (PAE-azide 1) were prepared with the following recipe:

|  | PAE 1 | | PAE-alkyne 1 | | PAE-azide 1 | |
| --- | --- | --- | --- | --- | --- | --- |
|  | Amount/g | Weight-% | Amount/g | Weight-% | Amount/g | Weight-% |
| Methyl methacrylate | 115.00 | 44.32 | 90.00 | 34.68 | 90.00 | 34.68 |
| Butyl acrylate | 135.70 | 52.29 | 135.70 | 52.29 | 135.70 | 52.29 |
| Acrylic acid | 6.30 | 2.43 | 6.30 | 2.43 | 6.30 | 2.43 |
| Propargyl methacrylate (M3-3) | 0 | 0 | 25.00 | 9.63 | 0 | 0 |
| 2-Azidoethyl methacrylate (M4-1) | 0 | 0 | 0 | 0 | 25.00 | 9.63 |
| Sodium laureth sulfate | 0.50 | 0.19 | 0.50 | 0.19 | 0.50 | 0.19 |
| Octylphenoxypolyethoxyethanol | 1.00 | 0.39 | 1.00 | 0.39 | 1.00 | 0.39 |
| Ammonium persulfate | 1.00 | 0.39 | 1.00 | 0.39 | 1.00 | 0.39 |
| Total polymer | 259.50 | 100.00 | 259.50 | 100.00 | 259.50 | 100.00 |
| Water | 389.25 | — | 389.25 | — | 389.25 | — |
| Solid content, % | 40.00% | | 40.00% | | 40.00% | |

The polyacrylate emulsions were prepared according to the above recipe and the following procedure. Firstly, a kettle solution comprising 40% amount of sodium laureth sulfate, octylphenoxypolyethoxyethanol, ammonium persulfate and water was charged into a 1000 mL four-necked flask equipped with a reflux condenser, a nitrogen gas inlet tube, a poly(tetrafluoroethylene) stirrer, and a feeding tubes for pre-emulsions. Meanwhile, 60% amount of remaining sodium laureth sulfate, octylphenoxypolyethoxyethanol, ammonium persulfate and water were vigorously mixed uniform with total methyl methacrylate, butyl acrylate, acrylic acid and propargyl methacrylate or 2-azidoethyl methacrylate to get a pre-emulsion according to the recipe of PAE 1, PAE-alkyne 1 or PAE-azide 1. The kettle solution in flask was heated to 80° C. and the pre-emulsion was added into kettle solution to start the free-radical polymerization. The addition of pre-emulsion was completed in 4-5 hours at a constant rate, the reaction was allowed to continue for another 2 hours at 85° C., then the emulsions was then cooled to room temperature and PAE 1, PAE-alkyne 1 or PAE-azide 1 were prepared.

EXAMPLE 6

Example of Synthesis of Non-Clickable Waterborne Polyurethane (WPU 2), Waterborne Polyurethane with Pendant Groups Bearing Alkyne Groups (WPU-Alkyne 2) and Waterborne Polyurethane with Pendant Groups Bearing Azide Groups (WPU-Azide 2).

Non-clickable waterborne polyurethane (WPU 2), waterborne polyurethane with pendant groups bearing alkyne groups (WPU-alkyne 2) and waterborne polyurethane with pendant groups bearing azide groups (WPU-azide 2) were prepared with the following recipe:

|  | WPU 2 | | WPU-alkyne 2 | | WPU-azide 2 | |
| --- | --- | --- | --- | --- | --- | --- |
|  | Amount/g | Weight-% | Amount/g | Weight-% | Amount/g | Weight-% |
| 1,6-Hexamethylene diisocyanate | 80.00 | 41.56 | 80.00 | 41.56 | 80.00 | 41.56 |
| Polytetramethylene ether glycol(Mn = 2000) | 72.00 | 37.40 | 72.00 | 37.40 | 72.00 | 37.40 |

-continued

|  | WPU 2 | | WPU-alkyne 2 | | WPU-azide 2 | |
| --- | --- | --- | --- | --- | --- | --- |
|  | Amount/g | Weight-% | Amount/g | Weight-% | Amount/g | Weight-% |
| Dimethylol propionic | 16.00 | 8.31 | 16.00 | 8.31 | 16.00 | 8.31 |
| 1,4-Butanediol | 12.00 | 6.23 | 0 | 0 | 0 | 0 |
| Propargyl 2,2-bis(hydroxymethyl) butanoate (M1-2) | 0 | 0 | 12.00 | 6.23 | 0 | 0 |
| 2-(Azidomethyl)-2-ethylpropane-1,3-diol (M2-2) | 0 | 0 | 0 | 0 | 12.00 | 6.23 |
| Triethylamine | 10.70 | 5.56 | 10.70 | 5.56 | 10.70 | 5.56 |
| Ethylenediamine | 1.80 | 0.94 | 1.80 | 0.94 | 1.80 | 0.94 |
| Total polymer | 192.50 | 100% | 192.50 | 100% | 192.50 | 100% |
| Water | 310.00 | — | 310.00 | — | 310.00 | — |
| Solid content, % | 38.31% | | 38.31% | | 38.31% | |

The waterborne polyurethane samples were prepared according to the above recipe and the following procedure. Firstly, 1,6-hexamethylene diisocyanate (HDI) and poly(tetramethylene ether) glycol were charged into a 500 mL dried four-necked flask with a mechanical stirrer, thermometer, condenser, and nitrogen in/outlet. The mixture was uniform after being stirred for 10 min, and increased the temperature to 85° C., maintained reaction for 2 hours. Then, dimethylol propionic and 1,4-butanediol (for WPU 2) or propargyl 2,2-bis(hydroxymethyl) butanoate (for WPU-alkyne 2) or 2-(azidomethyl)-2-ethylpropane-1,3-diol (for WPU-azide 2) were added into the flask and kept reaction for 3-4 hours. The isocyanate (NCO) content was monitored during the reaction using the standard dibutylamine back titration method. Upon reaching the theoretical NCO value, started to decrease the temperature to 40° C., if the viscosity of prepolymer was high, 20 ml acetone could be added into flask. At last, triethylamine was added and stirred for 20 minutes at 40° C. to neutralize the prepolymer, and deionized water with ethylenediamine was added to the reaction mixture with vigorous stirring (about 1500 rpm) for 15 minutes and WPU 2, WPU-alkyne 2 or WPU-azide 2 were prepared.

EXAMPLE 7

Example of Synthesis of Non-Clickable Polyester Dispersions (PED 2), Polyester Dispersions with Pendant Groups Bearing Alkyne Groups (PED-Alkyne 2) and Polyester Dispersions with Pendant Groups Bearing Azide Groups (PED-Azide 2).

Non-clickable polyester dispersions (PED 2), polyester dispersions with pendant groups bearing alkyne groups (PED-alkyne 2) and polyester dispersions with pendant groups bearing azide groups (PED-azide 2) were prepared with the following recipe:

|  | PED 2 | | PED-alkyne 2 | | PED-azide 2 | |
| --- | --- | --- | --- | --- | --- | --- |
|  | Amount/g | Weight-% | Amount/g | Weight-% | Amount/g | Weight-% |
| Neopentyl glycol | 80.20 | 25.68 | 80.20 | 25.68 | 80.20 | 25.68 |
| 1,8-Octanediol | 38.30 | 12.27 | 0 | 0 | 0 | 0 |
| propargyl 2,2-bis(hydroxymethyl) butanoate (M1-2) | 0 | 0 | 38.30 | 12.27 | 0 | 0 |
| 2-(azidomethyl)-2-ethylpropane-1,3-diol (M2-2) | 0 | 0 | 0 | 0 | 38.30 | 12.27 |
| Tetrahydrophthalic anhydride | 145.10 | 46.47 | 145.10 | 46.47 | 145.10 | 46.47 |
| 5-Sulfoisophthalic acid sodium | 48.65 | 15.58 | 48.65 | 15.58 | 48.65 | 15.58 |
| Total polymer | 312.25 | 100% | 312.25 | 100% | 312.25 | 100% |
| Water | 381.60 | — | 381.60 | — | 381.60 | — |
| Solid content, % | 45.00% | | 45.00% | | 45.00% | |

The polyester dispersions samples were prepared according to the above recipe and the following procedure. Firstly, neopentyl glycol and 1,8-octanediol (for PED 2) or propargyl 2,2-bis(hydroxymethyl) butanoate (for PED-alkyne 2) or 2-(azidomethyl)-2-ethylpropane-1,3-diol (for PED-azide 2), and tetrahydrophthalic anhydride, 5-sulfoisophthalic acid sodium were charged into a 1000 mL dried four-necked flask with a mechanical stirrer, thermometer, condenser, and nitrogen in/outlet. Then, the mixture was heated to 150° C. and kept reaction in molten state for 3 hours. In order to further improve the extent of reaction, 50 mL toluene was added to reflux at about 200° C. for about 10-1 hours. The reaction temperature was reduced to 160° C. and started to remove small molecules from the mixture under vacuum of −0.05 to −0.1 MPa for 2-3 hours. The acid value was monitored during the reaction using the standard method of ASTM D 974. Upon reaching a constant theoretical acid value, the temperature was reduced to 50° C. and deionized water was added to the reaction mixture with vigorous stirring (about 800-1000 rpm) for 30 minutes and PED 2, PED-alkyne 2 or PED-azide 2 were prepared.

EXAMPLE 8

Example of Synthesis of Non-Clickable Polyacrylate Emulsions (PAE 2), Polyacrylate Emulsions with Pendant Groups Bearing Alkyne Groups (PAE-Alkyne 2) and Polyacrylate Emulsions with Pendant Groups Bearing Azide Groups (PAE-Azide 2).

Non-clickable polyacrylate emulsions (PAE 2), polyacrylate emulsions with pendant groups bearing alkyne groups (PAE-alkyne 2) and polyacrylate emulsions with pendant groups bearing azide groups (PAE-azide 2) were prepared with the following recipe:

|  | PAE 2 | | PAE-alkyne 2 | | PAE-azide 2 | |
| --- | --- | --- | --- | --- | --- | --- |
|  | Amount/g | Weight-% | Amount/g | Weight-% | Amount/g | Weight-% |
| Ethyl methacrylate | 95.80 | 44.50 | 80 | 37.16 | 80 | 37.16 |
| Ethyl hexyl acrylate | 112.30 | 52.17 | 112.3 | 52.17 | 112.30 | 52.17 |
| Methacrylic acid | 5.25 | 2.44 | 5.25 | 2.44 | 5.25 | 2.44 |
| Propargyl acrylate (M3-1) | 0 | 0 | 15.8 | 7.34 | 0 | 0 |
| 4-Azidomethyl styrene (M4-5) | 0 | 0 | 0 | 0 | 15.8 | 7.34 |
| Sodium laureth sulfate | 0.42 | 0.20 | 0.42 | 0.20 | 0.42 | 0.20 |
| Octylphenoxypolyethoxyethanol | 0.65 | 0.30 | 0.65 | 0.30 | 0.65 | 0.30 |
| Ammonium persulfate | 0.85 | 0.39 | 0.85 | 0.39 | 0.85 | 0.39 |
| Total polymer | 215.27 | 100.00 | 215.27 | 100.00 | 215.27 | 100.00 |
| Water | 263.10 | — | 263.10 | — | 263.10 | — |
| Solid content, % | 45.00% | | 45.00% | | 45.00% | |

The polyacrylate emulsions were prepared according to the above recipe and the following procedure. Firstly, a kettle solution comprising 40% amount of sodium laureth sulfate, octylphenoxypolyethoxyethanol, ammonium persulfate and water was charged into a 1000 mL four-necked flask equipped with a reflux condenser, a nitrogen gas inlet tube, a poly(tetrafluoroethylene) stirrer, and a feeding tubes for pre-emulsions. Meanwhile, 60% amount of remaining sodium laureth sulfate, octylphenoxypolyethoxyethanol, ammonium persulfate and water were vigorously mixed uniform with total ethyl methacrylate, ethyl hexy acrylate, methacrylic acid and propargyl acrylate or 4-azidomethyl styrene to get a pre-emulsion according to the recipe of PAE 2, PAE-alkyne 2 or PAE-azide 2. The kettle solution in flask was heated to 80° C. and the pre-emulsion was added into kettle solution to start the free-radical polymerization. The addition of pre-emulsion was completed in 4-5 hours at a constant rate, the reaction was allowed to continue for another 2 hours at 85° C., then the emulsions was then cooled to room temperature and PAE 2, PAE-alkyne 2 or PAE-azide 2 were prepared.

EXAMPLE 9

Example of the Synthesis of Click-Crosslinked Waterborne Polymers: Click-Crosslinked WPU, Non-Clickable WPU and Physical Mixing WPU; Click-Crosslinked PED, Non-Clickable PED and Physical Mixing PED; Click-Crosslinked PAE, Non-Clickable PAE and Physical Mixing PAE.

Click-crosslinked WPU: the click crosslinking reaction was conducted between WPU-alkyne 2 and WPU-azide 2 (prepared in example 6) as follows: 15 g WPU-alkyne 2, 15 g WPU-azide 2 and solution of 0.05 g copper sulfate in 1 mL water were mixed together and the mixture was stirred slowly for 5 min, then a solution of 0.20 g sodium ascorbate in 1 mL water was added into the mixture and the click reaction was conducted. The mixture was stirred for additional 2 minutes, then 10 g of mixture was poured into a 6 cm diameter-teflon disk to be dried at room temperature for 48 hours. The film was taken out for test.

Non-clickable WPU: 10 g of non-clickable WPU 2 (prepared in example 6) was poured into a 6 cm diameter-teflon disk to be dried at room temperature for 48 hours and the film was taken out for test as reference.

Physical mixing WPU: 5 g WPU-alkyne 2 and 5 g WPU-azide 2 (prepared in example 6) were mixed together and poured into a 6 cm diameter-teflon disk to be dried at room temperature for 48 hours. The film was taken out for test as reference.

Click-crosslinked PED: the click-crosslinking reaction was conducted between PED-alkyne 2 and PED-azide 2 (prepared in example 7) as follows: 15 g PED-alkyne 2, 15 g PED-azide 2 and solution of 0.05 g copper sulfate in 1 mL water were mixed together and the mixture was stirred slowly for 5 min, then a solution of 0.20 g sodium ascorbate in 1 mL water was added into the mixture and the click reaction was initiated. The mixture was stirred for additional 2 minutes, then 10 g of mixture was poured into a 6 cm diameter-teflon disk to be dried at room temperature for 48 hours. The film was taken out for test.

Non-clickable PED: 10 g of non-clickable PED 2 (prepared in example 7) was poured into a 6 cm diameter-teflon disk to be dried at room temperature for 48 hours and the film was taken out for test as reference.

Physical mixing PED: 5 g PED-alkyne 2 and 5 g PED-azide 2 (prepared in example 7) were mixed together and poured into a 6 cm diameter-teflon disk to be dried at room temperature for 48 hours. The film was taken out for test as reference.

Click-crosslinked PAE: the click-crosslinking reaction was conducted between PAE-alkyne 2 and PAE-azide 2 (prepared in example 8) as follows: 15 g PAE-alkyne 2, 15 g PAE-azide 2 and solution of 0.05 g copper sulfate in 1 mL water were mixed together and the mixture was stirred slowly for 5 min, then a solution of 0.20 g sodium ascorbate in 1 mL water was added into the mixture and the click reaction was initiated. The mixture was stirred for additional 2 minutes, then 10 g of mixture was poured into a 6 cm diameter-teflon disk to be dried at room temperature for 48 hours. The film was taken out for test.

Non-clickable PAE: 10 g of non-clickable PAE 2 (prepared in Example 8) was poured into a 6 cm diameter-teflon disk to be dried at room temperature for 48 hours and the film was taken out for test as reference.

Physical mixing PAE: 5 g PAE-alkyne 2 and 5 g PAE-azide 2 (prepared in example 8) were mixed together and poured into a 6 cm diameter-teflon disk to be dried at room temperature for 48 hours. The film was taken out for test as reference.

EXAMPLE 10

Example of the Synthesis of Clickable Functional Compounds: BIT-Alkyne, PHMG-Alkyne, ITO NPs-Alkyne, and ITO NPs-Azide.

Alkyne-functionalized benzisothiazolinone (BIT-alkyne) was prepared according to the following procedure. In a 250 mL flask, 10 g BIT was dissolved in 100 mL ethanol, and heated to 40° C., and then added 0.3 g of sodium hydride and 15 g 3-bromo-propynyl. The mixture was kept stirred for 16-24 hours. After completion of the reaction, water (100 mL) was added and mixed, the aqueous layer was then separated and excess 3-bromo-propynyl extracted with Dichloromethane. The BIT-alkyne in aqueous phase was ready for use.

Alkyne-functionalized polyhexamethylene guanidine hydrochloride (PHMG-alkyne) was prepared according to the following procedure. In a 500 mL flask, 25 g BIT was dissolved in 200 mL tetrahydrofuran (THF), and heated to 50° C., and then added 0.8 g of sodium ethoxide and 28 g 3-chloro-propynyl. The mixture was kept stirred for 16-24 hours reaction. After completion of the reaction, water (250 mL) was added and mixed, the aqueous layer was then separated and excess 3-bromo-propynyl extracted with dichloromethane. The PHMG-alkyne in aqueous phase was ready for use.

Alkyne-modified indium tin oxide nanoparticles (ITO NPs-alkyne) was prepared according to the following procedure. Firstly, 0.02 mol 3-aminopropyl-triethoxysilane and 0.035 mol 3-bromo-propynyl were mixed in 200 mL dimethylformamide (DMF), then 0.1 g sodium hydride was added and maintained the reaction at 30° C. for 16-24 hours to get alkyne functionalized 3-aminopropyl-trimethoxysilane; Secondly, 3.5 g ITO NPs was dispersed in 200 mL water, followed by the addition of 1.4 g tetraethyl orthosilicate (TEOS), and vigorous stirred for 24 hours. The suspension was repeatedly washed, filtered for several times and dried under vacuum to get ITO NPs with silica shell treatment. Thirdly, 5.5 g alkyne functionalized 3-aminopropyl-trialkoxysilane and 2.5 g ITO NPs with silica shell treatment prepared above were added in a 250 mL flask, with the addition of 80 mL tetrahydrofuran (THF) as solvent and 0.08 g sodium hydride as catalyst to react at 65° C. for 24 hours. The resultant particles were collected and washed with ethanol and deionized water, and then dried under vacuum for 24 hours to get ITO NPs-alkyne for further use.

Azide-functionalized indium tin oxide nanoparticles (ITO NPs-azide) was prepared according to the following procedure. Firstly, 0.02 mol ITO NPs was dispersed in 150 mL water, followed by the addition of 0.5 g tetraethyl orthosilicate (TEOS), and vigorous stirred for 24 hours to get ITO NPs with silica shell treatment. The suspension was repeatedly washed, filtered for several times and dried under vacuum to get ITO NPs with silica shell treatment. Secondly, 0.015 mol ITO NPs with silica shell treatment and 80 mL tetrahydrofuran (THF) were mixed together in a beaker, and then 0.24 g NaH was dispersed into the mixture and 28.5 g 3-bromopropyl triethoxysilane was dropwise added in 30 minutes at room temperature and then increased the temperature to 70° C. for 24 hours to get ITO NPs-bromine particles. Thirdly, ITO NPs-bromine prepared above and sodium azide ($NaN_3$), in (iv) suitable solvent, such as such as ethyl acetate, tetrahydrofuran and DMF at a temperature of 100-120° C. for 12-16 hours. Thirdly, 5 g of ITO NPs-bromine and 2 g of sodium azide ($NaN_3$) in 100 mL of DMF were combined under an inert atmosphere. The solution was stirred at 120° C. for 18 hours. The particles were recovered by centrifugation at 3000 rpm for 30 min. The cycle of centrifugation and redispersion in water was repeated three times. Obtained particles were ITO NPs-azide.

EXAMPLE 11

Example of the Synthesis of Functional Waterborne Polymers: WPU-BIT, WPU-PHMG, PAE-PHMG, PED-ITO NPs and WPU-ITO NPs.

WPU-BIT: the click reaction was performed between WPU-azide 1 (prepared in example 3) and BIT-alkyne (prepared in example 10) as follows: 2 g BIT-alkyne was added to 15 g WPU-azide 1 at room temperature under stirring followed by the addition of 0.01 g $CuSO_4.5H_2O$ in 1 mL water and 0.03 g sodium ascorbate in 1 mL water, respectively, and then the click reaction was initiated. The mixture was stirred for additional 2 minutes, then 10 g of mixture was poured into a 6 cm diameter-teflon disk to be dried at room temperature for 48 hours.

WPU-PHMG: the click reaction was performed between WPU-azide 1 (prepared in example 3) and PHMG-alkyne (prepared in example 10) as follows: 2.8 g PHMG-alkyne was added to 15 g WPU-azide 1 at room temperature under stirring followed by the addition of 0.01 g $CuSO_4.5H_2O$ in 1 mL water and 0.03 g sodium ascorbate in 1 mL water, respectively, and then the click reaction was initiated. The mixture was stirred for additional 2 minutes, then 10 g of mixture was poured into a 6 cm diameter-teflon disk to be dried at room temperature for 48 hours.

PAE-PHMG: the click reaction was performed between PAE-azide 1 (prepared in example 5) and PHMG-alkyne (prepared in example 10) as follows: 2.8 g PHMG-alkyne was added to 15 g PAE-azide 1 at room temperature under stirring followed by the addition of 0.01 g $CuSO_4.5H_2O$ in 1 mL water and 0.03 g sodium ascorbate in 1 mL water, respectively, and then the click reaction was initiated. The mixture was stirred for additional 2 minutes, then 10 g of mixture was poured into a 6 cm diameter-teflon disk to be dried at room temperature for 48 hours.

PED-ITO NPs: the click reaction was performed between PED-azide 1 (prepared in example 4) and ITO NPs-alkyne (prepared in example 10) as follows: 3.2 g ITO NPs-alkyne was added to 15 g PED-azide 1 at room temperature under stirring followed by the addition of 0.01 g $CuSO_4.5H_2O$ in 1 mL water and 0.03 g sodium ascorbate in 1 mL water, respectively, and then the click reaction was initiated. The mixture was stirred for additional 2 minutes, then 10 g of mixture was poured into a 6 cm diameter-teflon disk to be dried at room temperature for 48 hours.

WPU-ITO NPs: the click reaction was performed between WPU-alkyne 1 (prepared in example 3) and ITO NPs-azide (prepared in example 10) as follows: 3.0 g ITO NPs-azide was added to 15 g WPU-alkyne 1 at room temperature under stirring followed by the addition of 0.01 g $CuSO_4 \cdot 5H_2O$ in 1 mL water and 0.03 g sodium ascorbate in 1 mL water, respectively, and then the click reaction was initiated. The mixture was stirred for additional 2 minutes, then 10 g of mixture was poured into a 6 cm diameter-teflon disk to be dried at room temperature for 48 hours.

Although the present disclosure has been described with respect to one or more particular embodiments and/or examples, it will be understood that other embodiments and/or examples of the present disclosure may be made without departing from the scope of the present disclosure.

What is claimed is:

1. A method of making a crosslinked polyurethane polymer comprising a 1,2,3-triazole crosslinking group comprising:
   a) reacting a diisocyanate with a macromolecular polyol;
   b) adding dimethylol propionic acid to the product from a) to introduce carboxylic acid groups;
   c) adding a clickable diol bearing alkyne or azide group(s) to the product from b) to modify polyurethane with clickable reactive groups;
   d) adding a base to neutralize carboxylic acid to render the resulting polyurethane dispersible in water;
   e) adding a chain extender the product from d),
   wherein the aqueous dispersion of a clickable waterborne polyurethane comprising alkyne groups or clickable waterborne polyurethanes comprising azide groups is formed; and
   f) contacting a clickable waterborne polyurethane comprising alkyne groups and a clickable polyurethane comprising azide groups with a copper(I) catalyst under conditions such that a crosslinked polyurethane polymer comprising a 1,2,3-triazole crosslinking group is formed from an alkyne group of the clickable waterborne polyurethane comprising alkyne groups and an azide group of the clickable polyurethane comprising azide groups, and
   optionally, contacting the crosslinked polyurethane polymer with alkyne modified nanoparticles or azide modified nanoparticles with a copper(I) catalyst under conditions such that a polyurethane polymer having at least one nanoparticle linked to the polymer backbone via a linking group comprising a 1,2,3-triazole group is formed from an alkyne group of the crosslinked polyurethane polymer or an azide group of the crosslinked polyurethane polymer and an azide group of an azide modified nanoparticle or an alkyne group of an alkyne modified nanoparticle, respectively,
   wherein a nanoparticle functionalized crosslinked polyurethane polymer is formed, or
   contacting a clickable waterborne polyurethane comprising alkyne groups or a clickable waterborne polyurethane comprising azide groups with azide modified nanoparticles or alkyne modified nanoparticles, respectively, with a copper(I) catalyst under conditions such that a polyurethane polymer having at least one nanoparticle linked to the polymer backbone via a linking group comprising a 1,2,3-triazole group is formed from an alkyne group of the crosslinked polyurethane polymer or an azide group of the crosslinked polyurethane polymer and an azide group of an azide modified nanoparticle or an alkyne group of an alkyne modified nanoparticle, respectively,
   wherein a nanoparticle functionalized clickable waterborne polyurethane polymer comprising alkyne groups or a nanoparticle functionalized clickable waterborne polyurethane polymer comprising azide groups is formed, and
   contacting the nanoparticle functionalized clickable waterborne polyurethane polymer comprising alkyne groups and a nanoparticle functionalized clickable waterborne polyurethane polymer comprising azide groups with a copper(I) catalyst under conditions such that a crosslinked polyurethane polymer comprising a 1,2,3-triazole crosslinking group is formed from an alkyne group of the clickable waterborne polyurethane comprising alkyne groups and an azide group of the clickable polyurethane comprising azide groups.

2. The method of claim 1, wherein the alkyne modified nanoparticles are alkyne modified indium tin oxide nanoparticles or azide modified nanoparticles are azide modified indium tin oxide nanoparticles.

3. The method of claim 1, wherein one or more of the contacting is/are carried out in an aqueous medium.

4. The method of claim 1, wherein or more of the contacting is/are carried out at room temperature.

5. The method of claim 1, wherein one or more of the copper(I) catalyst is/are formed in situ.

6. The method of claim 1, wherein the clickable waterborne polyurethane polymer comprises 5% to 20% alkyne groups by weight based on the total solid weight of the clickable waterborne polyurethane polymer.

7. The method of claim 1, wherein the clickable waterborne polyurethane polymer comprises 5% to 20% azide groups by weight based on the total solid weight of the clickable waterborne polyurethane polymer.

8. The method of claim 1, wherein the clickable diol bearing alkyne or azide group(s) is chosen from:

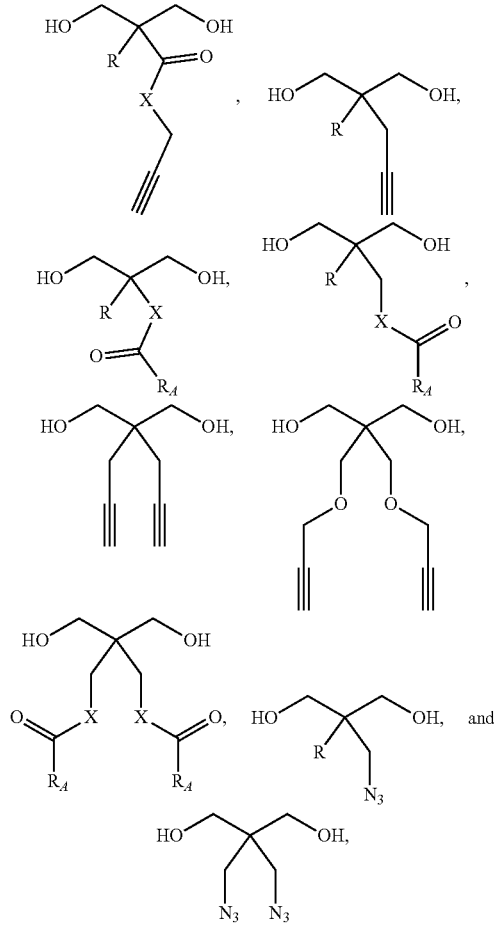

wherein
X is independently chosen from —O— and —NH—,
R is chosen from —CH$_3$ and —CH$_2$CH$_3$,
R$_4$ is chosen from
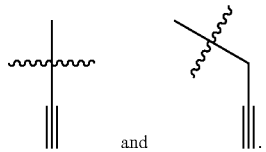 and .
* * * * *